United States Patent
Chisholm et al.

(10) Patent No.: US 7,147,787 B2
(45) Date of Patent: Dec. 12, 2006

(54) PROCESS FOR TREATMENT OF AQUEOUS ENVIRONMENTS CONTAINING A WATER-SOLUBLE POLYMER

(75) Inventors: Robert D. Chisholm, McKinney, TX (US); Debrah A. Beck, Denton, TX (US); John B. Steward, McKinney, TX (US); Jordan M. Johnston, Whitesboro, TX (US); Baosheng Lee, Duluth, GA (US)

(73) Assignee: Microtek Medical Holdings, Inc, Norcross, GA (US)

( * ) Notice: Subject to any disclaimer, the term of this patent is extended or adjusted under 35 U.S.C. 154(b) by 79 days.

(21) Appl. No.: 10/453,711

(22) Filed: Jun. 3, 2003

(65) Prior Publication Data

US 2003/0205524 A1    Nov. 6, 2003

Related U.S. Application Data

(60) Division of application No. 10/084,253, filed on Feb. 27, 2002, now Pat. No. 6,623,643, which is a continuation of application No. 09/863,826, filed on May 23, 2001, now abandoned, which is a continuation-in-part of application No. 09/863,014, filed on May 22, 2001, now abandoned, which is a continuation-in-part of application No. 09/669,263, filed on Sep. 25, 2000, now abandoned, which is a continuation-in-part of application No. 09/515,982, filed on Sep. 25, 2000, now abandoned.

(60) Provisional application No. 60/166,680, filed on Nov. 19, 1999.

(51) Int. Cl.
    *C02F 1/72* (2006.01)
(52) U.S. Cl. ........................ 210/758; 210/759; 210/760; 588/20; 588/227; 525/61

(58) Field of Classification Search .............. 210/660, 210/748, 758, 759, 760, 767, 908; 588/1, 588/20, 227; 204/158.21; 525/61; 528/480
See application file for complete search history.

(56) References Cited

U.S. PATENT DOCUMENTS

| | | | |
|---|---|---|---|
| 3,859,269 | A | 1/1975 | Maurer |
| 5,110,481 | A | 5/1992 | Sando et al. |
| 5,181,967 | A | 1/1993 | Honeycutt |
| 5,241,045 | A | 8/1993 | Matz |
| 6,184,340 | B1 | 2/2001 | Smith et al. |

FOREIGN PATENT DOCUMENTS

| | | |
|---|---|---|
| JP | 51146759 | 12/1976 |
| JP | 55035956 | 3/1980 |
| JP | 11019664 | 1/1999 |
| JP | 11172039 | 6/1999 |

OTHER PUBLICATIONS

Bates et al., "Hydrogen Peroxide Oxidation of Poly(vinyl Alcohol)", *J. Polym. Sci.: Polym. Chem. Ed.*, vol. 17. pp. 1867-1869 (1979).

(Continued)

*Primary Examiner*—Frank M. Lawrence

(57) ABSTRACT

A process wherein the use of a degradation-enhancing reactant or a precursor thereof, e.g., an oxidizing agent, can effectively increase the rate of reaction for the degradation of polymers in an aqueous environment and thereby facilitate the disposal of same. For example, in one aspect, the process comprises contacting a solubilized polymer and a degradation-enhancing reactant, within an aqueous environment, and subsequently reacting the polymer under conditions that are effective to provide at least one environmentally benign degradation product from the polymer.

21 Claims, 11 Drawing Sheets

OTHER PUBLICATIONS

Bossmann et al., "New Evidence against Hydroxyl Radicals as Reactive Intermediates in the Thermal and Photochemically Enhanced Fenton Reactions", *J. Phys. Chem. A.*, 102 (28) (1998) (Abstract).

Dedov, A.G. et al., "Catalytic oxidation of hydrocarbons with hydrogen peroxide", *Vestn. Mosk. Univ., Ser. 2:Khim.*, vol. 28, No. 5, pp. 521-522 (1985) (Abstract).

Fujita et al., "Biotreatment of persistent substances using effective microorganisms", *Water Sci. Technol.*, vol. 42, No. 12, pp. 93-106 (2000) (Abstract).

Kubota et al., "Formation of Peroxide on Polyvinyl Alcohol and its Characteristics", *J. Appl. Polym. Sci.*, vol. 23, No. 8, pp. 2271-2278 (1979) (Abstract).

Lee, "Swelling effect of semicrystalline poly(vinyl alcohol) in hydrogen peroxide", *J. Appl. Polym. Sci.*, vol. 42, No. 12, pp. 3077-3082 (1991) (Abstract).

Lei et al., "Oxidative degradation of polyvinyl alcohol by the photochemically enhanced Fenton reaction", *Journal of Photochemistry and Photobiology A: Chemistry*, vol. 116, pp. 159-166 (1998).

Lei et al., "Wet Oxidation of PVA-Containing Desizing Wastewater", *Chinese J. of Chem. Eng.*, vol. 8, No. 1, pp. 52-56 (2000).

Lei, "Advanced oxidation of poly(vinyl alcohol) by the photo-Fenton reaction", *Huanjing Kexue Xuebao*, vol. 20, No. 2, pp. 139-144 (2000) (Abstract).

Lin et al., "Fenton process for treatment of desizing wastewater", *Water Research*, vol. 31, No. 8, pp. 2050-2056 (1997) (Abstract).

Loomis, G.L. et al., "Design, preparation, and characterization of biodegradable compositions based on polyvinyl alcohol and related polymers", *Polymeric Materials: Science and Engineering (PMSE)*, vol. 67, pp. 292-293 (1992) (Abstract).

Oji, Lawrence N., "Oxidative Mineralization and Characterization of Polyvinyl Alcohol for Compatibility with Tank Farm Processing Chemistry (U)", *Westinghouse Savannah River Company*, pp. 1-48 (1999).

Sakumoto et al., "Treatment of Waste Water by a Combined Technique of Radiation and Conventional Method", *Radiat. Phys. Chem.*, vol. 24, No. 1, pp. 99-115 (1984).

Solaro et al., "Biodegradation of poly(vinyl alcohol) with different molecular weights and degree of hydrolysis", *Polym. Adv. Technol.*, vol. 11, Nos. 8-12, pp. 873-878 (2000) (Abstract).

Suzuki et al., "Ozone treatment of water-soluble polymers. IV. Ozone degradability of water-soluble polymers", *J. Appl. Polym. Sci.*, vol. 23, No. 11, pp. 3281-3288 (1979) (Abstract).

Suzuki, "Degradation of Polyvinyl Alcohol by Microorganisms", Applied Polymer Symposium 35. Stockholm, pp. 431-437, Confer. 012 (1976) (Abstract).

Tsuji, "Study of biodegradation of polyvinyl alcohol", *Seibunkaisei Kemikarusu to Purasuchikku*, pp. 166-173 (2000) (Abstract).

TABLE 1

| Experiment Number | PVA % (initial) | PVA Weight (g.) | Water volume (ml.) | Temp. (F.) | $H_2O_2$ volume (ml.) | $H_2O_2$ ratio (ml $H_2O_2$/g. PVA) | Reaction time (hrs.) | PVA % after reaction |
|---|---|---|---|---|---|---|---|---|
| 1 | 5 | 210 | 4000 | 190-220 | 168 | .8 | 2 | .004 |
| 2 | 8 | 320 | 4000 | 212-220 | 256 | .8 | 3 | .028 |
| 3 | 12 | 480 | 4000 | 200-225 | 380 | .8 | 3 | .02 |
| 4 | 16 | 320 | 2000 | 210-230 | 256 | .8 | 2 | .036 |
| 5 | 20 | 400 | 2000 | 215-240 | 260 | .65 | 2 | .562 |
| 6 | 24 | 480 | 2000 | 200-240 | 336 | .7 | 2 | .014 |

FIG. 7

Palo Verde Test

| Run | Batch Liters | % PVA | % H2O2 | Start pH | End pH | Change pH | Rad Hrs | Total Hrs | Wavelength | Watts |
|---|---|---|---|---|---|---|---|---|---|---|
| 1101-02C | 37.85 | 0.50 | 0.12 | 7.57 | 4.27 | 3.30 | 4.20 | 21.00 | 189 | 19.3 |
| 1102-03C | 37.85 | 0.50 | 0.12 | 7.08 | 4.06 | 3.02 | 3.77 | 18.85 | 189 | 19.3 |
| 1103-04C | 37.85 | 0.50 | 0.12 | 7.50 | 4.74 | 2.76 | 4.49 | 22.45 | 189 | 19.3 |
| 1104-05D | 37.85 | 0.50 | 0.12 | 8.34 | 4.61 | 3.73 | 0.88 | 4.40 | 189 | 19.3 |
| 1105-06D | 37.85 | 0.50 | 0.12 | 8.46 | 4.96 | 3.50 | 1.48 | 7.40 | 189 | 19.3 |
| 1106-D | 37.85 | 0.50 | 0.12 | 7.95 | 4.64 | 3.31 | 1.40 | 7.00 | 189 | 19.3 |
| 1107-D | 37.85 | 0.50 | 0.12 | 8.22 | 4.85 | 3.37 | 1.78 | 8.90 | 189 | 19.3 |
| 1108-D | 37.85 | 0.50 | 0.12 | 8.86 | 4.94 | 3.92 | 4.29 | 21.45 | 189 | 19.3 |
| 1109-D | 37.85 | 0.50 | 0.12 | 9.63 | 5.97 | 3.66 | 1.76 | 8.80 | 189 | 19.3 |
| 1110-D | 37.85 | 0.50 | 0.12 | 8.68 | 4.96 | 3.72 | 1.78 | 8.90 | 189 | 19.3 |
| 1111-D | 37.85 | 0.50 | 0.12 | 9.01 | 5.97 | 3.04 | 1.44 | 7.20 | 189 | 19.3 |
| 1112-D | 37.85 | 2.0 | 0.12 | 7.37 | 4.30 | 3.07 | 2.45 | 12.25 | 189 | 19.3 |
| 1113-D | 37.85 | 2.0 | 0.12 | 7.57 | 4.88 | 2.69 | 4.33 | 21.65 | 189 | 19.3 |
| 1114-D | 37.85 | 2.0 | 0.12 | 7.02 | 3.84 | 3.18 | 4.35 | 21.75 | 189 | 19.3 |
| 1115-D | 37.85 | 2.0 | 0.12 | 7.01 | 3.94 | 3.07 | 3.10 | 15.50 | 189 | 19.3 |
| 1116-D | 37.85 | 2.0 | 0.12 | 6.82 | 3.10 | 3.72 | 3.65 | 18.25 | 189 | 19.3 |
| 1117-D | 37.85 | 2.0 | 0.12 | 7.20 | 4.41 | 2.79 | 3.00 | 15.00 | 189 | 19.3 |
| Average | 37.85 | 1.03 | 0.12 | 7.90 | 4.61 | 3.29 | 2.83 | 14.16 | 189 | 19.3 |
| Standard Deviation | | | | 0.83 | 0.71 | 0.38 | 1.28 | 6.38 | | |
| Maximum | | | | 9.63 | 5.97 | 3.92 | 4.49 | 22.45 | | |
| Minimum | | | | 6.82 | 3.10 | 2.69 | 0.88 | 4.40 | | |
| Correlation | | | | | | 0.89 | | | | |

FIG. 8

Pilot Point Test

| Run | Batch Liters | % PVA | % H2O2 | Start pH | End pH | Change pH | Rad Hrs | Total Hrs | Wave-length | Watts |
|---|---|---|---|---|---|---|---|---|---|---|
| 1001C | 15.14 | 0.50 | 0.30 | 6.40 | 4.19 | 2.21 | 5.00 | 20.00 | 250 | 6.5 |
| 1002C | 15.14 | 0.50 | 0.30 | 6.80 | 4.14 | 2.66 | 5.25 | 21.00 | 250 | 6.5 |
| 1003C | 15.14 | 0.50 | 0.30 | 6.70 | 3.90 | 2.80 | 5.25 | 21.00 | 250 | 6.5 |
| 1104C | 15.14 | 0.50 | 0.30 | 6.12 | 4.23 | 1.89 | 5.25 | 21.00 | 250 | 6.5 |
| 1105C | 15.14 | 0.50 | 0.30 | 6.80 | 4.02 | 2.78 | 4.50 | 18.00 | 250 | 6.5 |
| 1106C | 15.14 | 0.50 | 0.30 | 6.80 | 4.10 | 2.70 | 5.50 | 22.00 | 250 | 6.5 |
| 1107C | 15.14 | 0.50 | 0.30 | 6.70 | 4.60 | 2.10 | 5.50 | 22.00 | 250 | 6.5 |
| 1108C | 15.14 | 0.50 | 0.30 | 6.70 | 3.90 | 2.80 | 4.75 | 19.00 | 250 | 6.5 |
| 1109C | 15.14 | 0.50 | 0.30 | 6.20 | 3.80 | 2.40 | 5.25 | 21.00 | 250 | 6.5 |
| 1110C[1] | 15.14 | 0.50 | 0.15 | 7.33 | 5.62 | 1.71 | 5.00 | 20.00 | 250 | 6.5 |
| 1111C | 15.14 | 0.50 | 0.30 | 8.50 | 5.77 | 2.73 | 5.25 | 21.00 | 250 | 6.5 |
| 1112C | 15.14 | 0.50 | 0.30 | 8.25 | 4.44 | 3.81 | 5.50 | 22.00 | 250 | 6.5 |
| 1113C | 15.14 | 0.50 | 0.30 | 6.50 | 4.65 | 1.85 | 5.25 | 21.00 | 250 | 6.5 |
| Average | 15.14 | 0.50 | 0.29 | 6.91 | 4.41 | 2.50 | 5.17 | 20.69 | | |
| Standard Deviation | | | | 0.72 | 0.63 | 0.56 | 0.30 | 1.18 | | |
| Maximum | | | | 8.50 | 5.77 | 3.81 | 5.50 | 22.00 | | |
| Minimum | | | | 6.12 | 3.80 | 1.71 | 4.50 | 18.00 | | |
| Correlation | | | | | | 0.66 | | | | |
| 991029C[2] | 15.14 | 0.50 | 0.00 | 7.54 | 7.08 | 0.46 | 4.00 | 16.00 | | |

1  Batch 991028C run with 1cc 30% H2O2 / 202cc water
2  Comments: Negative control, Batch 991029C run with UV only, no peroxide added. After 4.0 (Rad Hours) no reduction in PVA concentration was observed, as determined by color assay.

Radioactivity Concentrations (uc/cc)

| Run | | Cs-134 | Cs-137 | Co-58 | Co-60 | Mn-54 | Ag-110 | Sb-125 | Nb-95 | Zr-95 | Total Activity (uc/cc) | No. of Passes |
|---|---|---|---|---|---|---|---|---|---|---|---|---|
| PV06D | Solution Tank | 4.12E-07 | 4.27E-06 | 4.34E-06 | 8.67E-06 | <LLD | 6.43E-07 | 9.82E-07 | <LLD | <LLD | 1.82E-05 | |
| | IX Effluent | <LLD | <LLD | 6.22E-07 | 1.24E-06 | <LLD | <LLD | <LLD | <LLD | <LLD | 1.86E-06 | 1.0 |
| | Decon Factor | | | 7.0 | 5.4 | | | | | | 9.8 | |
| PV07D | Solution Tank | 3.06E-07 | 2.34E-06 | 2.40E-06 | 2.49E-06 | <LLD | <LLD | 8.98E-07 | <LLD | <LLD | 8.19E-06 | |
| | IX Effluent | <LLD | 1.31E-07 | 7.49E-07 | 1.84E-06 | <LLD | <LLD | <LLD | <LLD | <LLD | 2.52E-06 | 1.0 |
| | Decon Factor | | 17.9 | 3.2 | 1.5 | | | | | | 3.2 | |
| PV08D | Solution Tank | <LLD | 7.60E-07 | 8.17E-06 | 6.60E-06 | 3.92E-07 | <LLD | <LLD | <LLD | <LLD | 1.65E-05 | |
| | IX Effluent | <LLD | <LLD | 1.51E-06 | 1.94E-06 | <LLD | <LLD | <LLD | <LLD | <LLD | 3.45E-06 | 2.0 |
| | Decon Factor | | | 5.4 | 3.4 | | | | | | 4.9 | |
| PV09D | Solution Tank | <LLD | <LLD | 5.07E-06 | 2.72E-06 | 5.14E-07 | <LLD | <LLD | 2.32E-06 | 1.57E-06 | 1.22E-05 | |
| | IX Effluent | <LLD | <LLD | 2.24E-06 | 1.45E-06 | 1.50E-07 | <LLD | <LLD | 8.85E-07 | 6.39E-07 | 7.41E-06 | 4.0 |
| | Decon Factor | | | 2.3 | 1.9 | 3.4 | | | 2.6 | 2.5 | 1.6 | |
| PV13D | Reaction Tk | <LLD | <LLD | 9.89E-04 | 5.19E-04 | 5.27E-05 | <LLD | 1.44E-05 | 1.27E-04 | 7.31E-05 | 1.85E-03 | |
| | IX Influent | <LLD | <LLD | 1.30E-04 | 6.09E-05 | 6.76E-06 | <LLD | 3.58E-06 | 1.39E-05 | 8.96E-06 | 2.30E-04 | |
| | IX Effluent | <LLD | <LLD | 5.66E-07 | 2.84E-07 | <LLD | <LLD | <LLD | <LLD | <LLD | 8.32E-07 | 3.0 |
| | Filter DF | | | 7.6 | 8.5 | 7.8 | | 4.0 | 9.1 | 8.2 | 8.0 | |
| | IX DF | | | 228.9 | 229.5 | <LLD | | <LLD | <LLD | <LLD | 278.4 | |
| | System DF | | | 1741.2 | 1962.1 | <LLD | | <LLD | <LLD | <LLD | 2223.6 | |
| PV15D | Reaction Tk | <LLD | <LLD | 1.44E-03 | 6.85E-04 | 1.03E-04 | <LLD | 2.19E-05 | 3.09E-04 | 1.83E-04 | 2.92E-03 | |
| | IX Influent | <LLD | <LLD | 4.46E-05 | 1.71E-06 | 2.95E-06 | <LLD | <LLD | 7.82E-06 | 5.09E-06 | 7.86E-05 | |
| | IX Effluent | <LLD | <LLD | 1.38E-06 | 5.87E-07 | <LLD | <LLD | <LLD | 2.85E-07 | 1.72E-07 | 2.41E-06 | 1.0 |
| | Filter DF | | | 32.3 | 39.1 | 34.9 | | | 39.5 | 36.0 | 37.2 | |
| | IX DF | | | 32.8 | 29.1 | <LLD | | | 27.4 | 29.6 | 32.6 | |
| | System DF | | | 1058.8 | 1138.0 | | | | 1084.2 | 1084.0 | 1211.6 | |
| PV16D | Reaction Tk | <LLD | <LLD | 9.69E-04 | 5.69E-04 | 6.91E-05 | <LLD | 1.99E-05 | 2.00E-04 | 1.21E-04 | 2.05E-03 | |
| | IX Influent | <LLD | <LLD | 4.88E-06 | 2.13E-06 | 3.00E-07 | <LLD | <LLD | 1.01E-06 | 5.25E-07 | 8.84E-06 | |
| | IX Effluent | <LLD | <LLD | 4.55E-07 | 2.64E-07 | <LLD | <LLD | <LLD | 1.42E-07 | <LLD | 8.61E-07 | 3.0 |
| | Filter DF | | | 198.8 | 267.1 | 230.3 | | | 198.0 | 230.5 | 233.0 | |
| | IX DF | | | 10.7 | 8.1 | | | | 7.1 | | 10.3 | |
| | System DF | | | 2129.7 | 2155.3 | | | | 1408.5 | | 2392.6 | |
| PV15DR | Reaction Tk | <LLD | <LLD | 1.38E-03 | 7.46E-04 | 8.78E-05 | <LLD | 3.05E-05 | 2.21E-04 | 1.35E-04 | 2.70E-03 | |
| | IX Influent | <LLD | <LLD | 2.21E-07 | 1.41E-07 | <LLD | <LLD | <LLD | <LLD | <LLD | 3.61E-07 | |
| | IX Effluent | <LLD | <LLD | 2.23E-07 | 2.64E-07 | <LLD | <LLD | <LLD | <LLD | <LLD | 2.23E-07 | 3.0 |
| | Filter DF | | | 6153.6 | 5290.8 | | | | | | 7479.2 | |
| | IX DF | | | 1.0 | | | | | | | 1.6 | |
| | System DF | | | 6098.7 | | | | | | | 12107.6 | |
| Discharge Spec. | | <2E-06 | <2E-05 | <3E-06 | <3E-05 | <6E-06 | <3E-05 | <3E-05 | <2E-05 | | | |

TABLE 5

| TEST | Starting dry PVA weight | WATER ADDED | 35% $H_2O_2$ ADDED | PVA - % after reaction | TEMPERATURE OF SOLUTION | Final pH | Heating time |
|---|---|---|---|---|---|---|---|
| 1 | 100 grms. | 2000 ml | 75 grms. | Non detected | 101° C - 102° C | 2.8 – 3.3 | 1 hr. |
| 2 | 100 grms. | 2000 ml | 75 grms. | Non detected | 101° C - 102° C | 2.8 – 3.3 | 1 hr. |
| 3 | 100 grms. | 2000 ml | 75 grms. | Non detected | 101° C - 102° C | 2.8 – 3.3 | 1 hr. |
| 4 | 100 grms. | 2000 ml | 75 grms. | Non detected | 101° C - 102° C | 2.8 – 3.3 | 1 hr. |
| 5 | 100 grms. | 2000 ml | 75 grms. | Non detected | 101° C - 102° C | 2.8 – 3.3 | 1 hr. |
| 6 | 100 grms. | 2000 ml | 75 grms. | Non detected | 101° C - 102° C | 2.8 – 3.3 | 1 hr. |
| 7 | 100 grms. | 2000 ml | 75 grms. | Non detected | 101° C - 102° C | 2.8 – 3.3 | 1 hr. |
| 8 | 100 grms. | 2000 ml | 75 grms. | Non detected | 101° C - 102° C | 2.8 – 3.3 | 1 hr. |
| 9 | 100 grms. | 2000 ml | 75 grms. | Non detected | 101° C - 102° C | 2.8 – 3.3 | 1 hr. |

FIG. 11

PROCESS FOR TREATMENT OF AQUEOUS ENVIRONMENTS CONTAINING A WATER-SOLUBLE POLYMER

This application is a divisional patent application of U.S. patent application Ser. No. 10/084,253 filed on Feb. 27, 2002, now U.S. Pat. No. 6,623,643, which application is a continuation application of U.S. patent application Ser. No. 09/863,826, filed on May 23, 2001, now abandoned, which application is a continuation-in-part application of U.S. patent application Ser. No. 09/863,014, filed on May 21, 2001, now abandoned, which application is a continuation-in-part application of U.S. patent application Ser. No. 09/669,263, filed on Sep. 25, 2000, now abandoned, which application is a continuation-in-part application of U.S. patent application Ser. No. 09/515,982, now abandoned filed on Feb. 25, 2000, now abandoned, which application claims the benefit of priority to U.S. Provisional Patent Application Ser. No. 60/166,680, filed on Nov. 19, 1999. The entire text of each of the above-referenced disclosures is specifically incorporated herein by reference in their entirety for all purposes.

FIELD OF THE INVENTION

This invention relates generally to a process for treating an aqueous environment comprising a polymer or a material comprising at least one polymer. In particular, the invention provides a process that is capable of accelerating the degradation of solubilized polymer into environmentally benign products and also substantially prevents the subsequent precipitation and solidification of solubilized polymer from an aqueous environment.

BACKGROUND OF THE INVENTION

During the twentieth century, international treaties, congressional acts, and executive orders have resulted in a number of regulations controlling all aspects of the environment and health and safety practices in the workplace. In particular, the disposal of industrial waste has been heavily regulated. Landfills nationwide have been closed and industry has been forced to turn to using alternatives such as conservation, recycling, fuel blending, deep-well injection and incineration.

A representative example is the medical industry which generates millions of pounds of waste each year. Much of that waste is related to the use of disposable materials, such as personal protective clothing, equipment, and accessories necessary for patient care that become contaminated with bloodborne pathogens and are therefore unsafe for reuse. To prevent the spread of disease, it is imperative, and required by law, that these materials be discarded and not reused.

In addition, the nuclear industry also generates millions of pounds of waste each year. In the nuclear industry, much of the waste is similarly related to the use of disposable materials such as personal protective clothing, bags, mop heads, rags, and other accessories that become contaminated by radioactive material, and are unsafe or impractical for reuse. The waste disposal and landfilling practices of the nuclear industry are highly regulated, and nuclear burial ground space is limited.

Various other industries also generate waste streams with similar characteristics. In seeking alternatives to landfilling and incineration, products have been developed that are water-soluble. Accordingly, these products present a convenient and cost effective alternative to conventional waste disposal means.

A readily available water-soluble polymer is polyvinyl alcohol (PVA). PVA is a tough, whitish polymer that can be formed into strong fabrics, films, tubes, fibers and other molded or extruded articles that are highly resistant to hydrocarbon solvents. While PVA is inherently water-soluble, the degree of solubility can be altered by various means known in the art. PVA is commonly used to make disposable personal equipment, such as garments, apparel, linens, drapes, towels, sponges, gauze, utensils, rags, mops and other useful articles. These articles are often produced from non-woven, woven, knitted or otherwise formed thermoplastic polyvinyl alcohol polymer films, fabrics, and fibers that are water-soluble. However, in addition to the development of PVA, other water-soluble polymer products have recently been developed as well. These materials have physical properties and characteristics very similar to that of PVA and, like PVA, these materials can also be used for manufacturing disposable personal equipment, such as garments, apparel, linens, drapes, towels, sponges, gauze, utensils, rags, mops and other useful articles.

Since the introduction of PVA materials, the practice in industry for disposing of these articles has been simply to solubilize them in hot water and discharge the resulting solution into sanitary sewers and drainage systems. As such, historical practice has involved placing garments, utensils, and other clothing accessories and equipment made of PVA film, fabric or fiber, into large hot water wash tanks in which the material is solubilized and then discharged to sanitary sewers or tank farms for further treatment of other contaminants.

It has recently been discovered that solubilized PVA material does not invariably remain in solution, as was once believed. Instead, the introduction of air or oxygen often present in turbulent fluid transport can initiate the precipitation and resolidification of the solubilized PVA material. The precipitated PVA material thus forms a hardened gelled like substance. This gelled substance can further dehydrate to form insoluble plastic plugs that can aggregate in pipes and drainage systems in close proximity to where the solutions were discharged. As a result, costly remediation actions have been, and may continue to be required in order to restore damaged piping, sewer lines, ditches and other means of waste stream conveyance.

It is unknown exactly how much precipitated PVA material may have been delivered to sanitary treatment facilities worldwide. However, under certain circumstances it is hypothesized that this resolidification phenomenon could potentially have a negative impact on many of the industries that relied upon the use of water-soluble PVA products. The failure to devise a viable treatment option could force numerous industries to once again rely on costly landfill and incineration alternatives. Therefore, the need exists to develop a process and system for treating solid waste comprising PVA or other water-soluble polymer materials that eliminates subsequent downstream precipitation of the polymer material from the liquid waste stream.

SUMMARY OF THE INVENTION

Among other aspects, the present invention is based on the surprising discovery that the use of a degradation-enhancing reactant or a precursor thereof, e.g., an oxidizing agent, can effectively increase the rate of reaction for the degradation of polymers in an aqueous environment. To this end, the present invention provides a process, which comprises contacting a polymer and a degradation-enhancing reactant in an aqueous environment under conditions effective to provide one or more degradation products. Preferably, at least one degradation product is a unique and different compound from the polymer and will therefore exhibit different physical and chemical characteristics such that it is no longer susceptible to precipitation from an aqueous environment.

Moreover, the present invention relates to a chemical process for reacting, degrading or otherwise breaking down a polymer in an aqueous environment such that it advantageously prevents, or at least substantially reduces, the subsequent precipitation of the solubilized polymer from an aqueous environment. For example, the process includes contacting a solubilized polymer and a degradation-enhancing reactant, within an aqueous environment, and subsequently reacting the polymer under conditions that are effective to provide at least one degradation product from the polymer.

In a first aspect, the present invention provides a process for treating a material comprising at least one polymer wherein a degradation-enhancing reactant and the material are introduced into an aqueous environment. The polymer is then reacted under conditions effective to provide one or more degradation products.

In another aspect, the present invention further provides a process for treating an otherwise provided aqueous environment comprising a material comprising at least one polymer wherein a degradation-enhancing reactant is introduced into the otherwise provided aqueous environment. The polymer is then reacted under conditions effective to provide one or more degradation products.

In still another aspect, the invention provides a process for treating an otherwise provided aqueous environment comprising both a degradation-enhancing reactant and material comprising at least one polymer. Once again, the polymer is reacted under conditions effective to provide at least one degradation product.

In an alternative aspect, the present invention also provides a process for treating an otherwise provided aqueous environment comprising at least one polymer wherein a degradation-enhancing reactant is introduced into the aqueous environment. The polymer is then reacted under conditions effective to provide at least one degradation product.

In still a further aspect, the present invention also provides a process for forming at least one degradation product from a material comprising at least one polymer wherein the polymer is reacted under conditions effective to provide at least one degradation product.

The processes of the present invention also include post-treatment of the degradation products.

Another aspect of the present invention includes apparatuses and systems for performing the foregoing processes.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention, and are not restrictive of the invention as claimed.

BRIEF DESCRIPTION OF THE FIGURES AND TABLES

The appended figures and tables constitute a part of this invention and include exemplary embodiments to the invention, which may be embodied in various forms. It is to be understood that in some instances various aspects of the invention may be shown exaggerated or enlarged to facilitate an understanding of the invention.

FIG. 7 is a table, designated TABLE 1, which provides the reaction conditions and corresponding results of Examples 1 through 6.

FIG. 8 is a table, designated TABLE 2, which provides the reaction conditions and corresponding results of a treatment process according to Example 14 as described herein.

FIG. 9 is a table, designated TABLE 3, which provides the reaction conditions and corresponding results of a treatment process according to Example 14 as described herein.

FIG. 10 is a table, designated TABLE 4, which provides the results of a radioisotope filtration analysis.

FIG. 11 is a table, designated TABLE 5, which provides the reaction conditions and corresponding results of a treatment process according to Example 15.

DETAILED DESCRIPTION OF THE INVENTION

Figure 1:
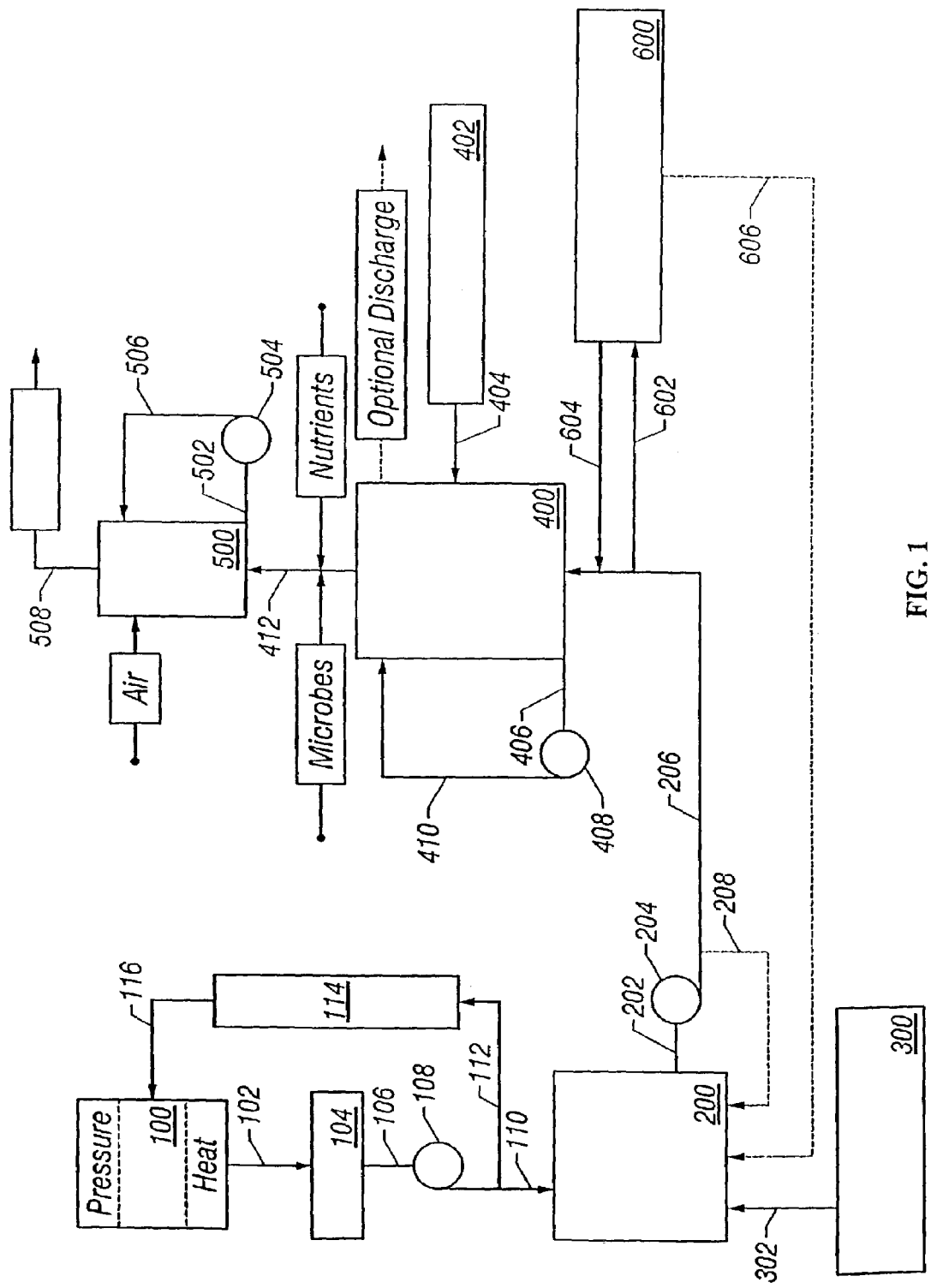
FIG. 1 is a schematic of the system suitable to practice one aspect of the inventive process.

The present invention may be understood more readily by reference to the following detailed description and any examples provided herein. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular forms "a," "an," and "the" comprise plural referents unless the context clearly dictates otherwise. For example, reference to a component in the singular is intended to comprise a plurality of components.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about" or "approximately," it will be understood that the particular value forms another embodiment.

The process of the present invention includes the treatment of polymer(s) as well as degradation-enhancing reactant(s) or precursors thereof which are present in an aqueous environment.

It should be understood that it is not essential to the practice of the present invention whether the polymer or a material including/comprising/made from the polymer is directly introduced into an aqueous environment or is otherwise provided in an aqueous environment by, e.g., the virtue of a waste stream. Additionally, the same holds true with respect to the degradation-enhancing reactant utilized in the process of the invention. In accordance with one aspect, the process comprises introducing at least one degradation-enhancing reactant into an aqueous environment. However, in an alternative aspect, an otherwise provided aqueous environment may already comprise a sufficient amount of a degradation-enhancing reactant.

To this end, the present invention encompasses any method and/or combination for ultimately contacting at least one degradation-enhancing reactant and at least one polymer within an aqueous environment provided that the degradation-enhancing reactant is ultimately present in an amount sufficient to react with the polymer under conditions effective to provide one or more degradation products.

As used herein, the term aqueous environment is intended to include any aqueous stream irrespective of where it originates. For example, suitable aqueous environments include waste streams, solutions, dispersions, suspensions, emulsions or any liquid phase that comprises water. The amount of water present is not critical. For example, the aqueous environment can comprise at least 5%, 10%, 15%, 20%, 25%, 30%, 35%, 40%, 45%, 50%, 55%, 60%, 65%, 70%, 75%, 80%, 85%, 90%, or 95% water by weight.

The aqueous environment can include a variety of components such as impurities, wastes and the like. Moreover, it can include a variety of water soluble radioactive and/or biological wastes.

The process of the present invention is applicable to any polymer that is degradable or otherwise capable of being reacted to provide one or more degradation products.

As used herein, the term "degradation product" refers to a reaction product resulting from the degradation, or breakdown of the polymer, and optionally, the degradation-enhancing reactant. In particular, at least one degradation product is preferably a compound that differs from the starting polymer. The degradation product may differ from the original polymer in such ways as molecular weight, degree of solubility, and molecular structure or composition.

It is also preferred according to the present invention that at least one degradation product should exhibit certain physical and/or chemical properties and characteristics such that it is not susceptible to precipitation from an aqueous environment. Non-limiting examples of such degradation products include oligomers, salts, organic salts, acids, organic acids, and water as well as similar polymers having an average degree of polymerization less than "n," wherein "n" represents the average degree of polymerization of the polymer.

In this regard, it is desirable, but not required, that the polymer have an average degree of polymerization, "n," wherein "n" is at least about 300, alternatively at least about 500, still alternatively at least 700 or even at least about 900. In another aspect, it is also desirable, but not required, that the polymer have a degree of polymerization, "n," wherein the value of "n" is less than about 10,000, or even less than about 9000, alternatively less than about 8000, or even less than about 7000, alternatively less than about 6000, or even less than about 5000, alternatively less than about 4000, still alternatively less than about 3000 or even less than about 2000.

In another aspect of the present invention, it is further desired for the polymer to be hydrolyzable.

It is also desirable for the polymer to be at least partially dissolved or solubilized in the aqueous environment. Thus, polymers preferred for use in the present invention are at least partially water-soluble. As used herein, the term "soluble" is intended to refer to the ability of a particular polymer to dissolve uniformly in an aqueous solution.

In a preferred aspect, the polymer has a degree of solubility of at least 50% in an aqueous solution with a degree of solubility of at least 75% being more preferred. More preferably, the polymer is completely soluble in an aqueous solution. However, lesser degrees of solubility will still work with the present invention, although, it is understood that the more soluble polymer is more preferred.

Where the polymer is not completely solubilized in the aqueous environment, the unsolubilized polymer can optionally be removed from the environment by a suitable means, such a filtration and then recycled or reused.

The process of the present invention has been proven effective for reacting solubilized polymer that is present in a range of concentrations. For example, the solubilized polymer can be present at concentrations of at least about 1%, 5%, 10%, 15%, 20%, 25%, 30%, 35%, 40%, 45%, or even at least about 50% by weight. However, in a preferred aspect, the concentration of solubilized polymer is within the approximate range of greater than 0% to about 10% by weight.

Examples of suitable polymers according to the invention include polyvinyl alcohol, polylactic acid, polyurethane resin, ion exchange resins, sodium polyacrylate, polymaleic acid, ammonium polyacrylate, microbial polyesters; polyhydroxybutyrate, polyhydroxybutyrate-valerate, polyhydroxyalkanoates, synthetic polyesters, polyglycolic acid, polyhydroxy acids, aliphatic polyesters, aromatic polyesters, aliphatic-aromatic copolyesters, aliphatic polyetheresters, aromatic polyetheresters, aliphatic-aromatic copolyetheresters, aliphatic polyesteramides, aromatic polyesteramides, aliphatic-aromatic copolyesteramides, aliphatic polyetherester amides, aromatic polyetherester amides, aliphatic-aromatic copolyetherester amides, polyethylene terephthalate, cellulose acetates, polycaprolactone, starch, starch blends, or any copolymers, combinations, or derivatives thereof.

It is to be understood that the polymers utilized in the present invention may come from a variety of sources. As disclosed herein, among other aspects, the present invention provides a process for treating a polymer or, alternatively, a material comprising at least one polymer. Accordingly, the polymer may come from materials or articles manufactured from fibers, non-woven, woven and knitted fabrics, plastics, films, resins, and cast or extrusion molded articles comprising at least one suitable polymer.

Examples of such articles and materials that can be used with the process include garments, protective clothing, apparel, linens, drapes, towels, composite fabrics and films, laminates fabrics and films, sponges, webs, plastic bags, gauzes, pads, wipes, booms, pillows, filaments, powders, granules and bandages. To this end, any useful material or article comprising at least one suitable polymer may be used according to the present invention.

In addition, a degradation-enhancing reactant or a precursor thereof is also present in the aqueous environment.

As used herein, the term degradation-enhancing reactant is intended to refer to a component capable of interacting, directly or indirectly, with the polymer so as to provide at least one degradation product. According to the present invention, the degradation-enhancing reactant is preferably present in an amount effective to increase the rate of reaction of the solubilized polymer as compared to the rate of such reaction without contacting the polymer with a degradation-enhancing reactant.

To this end, the optimal amount of degradation-enhancing reactant will, of course, vary according to the particular polymer and the concentration of solubilized polymer in the aqueous environment. As such, one of ordinary skill in the art would know or otherwise be able to determine such optimal amount without requiring undue experimentation. For example, where the polymer is PVA and the degradation-enhancing reactant derived from hydrogen peroxide, it has been discovered that in a preferred aspect of the present invention, it is desirable for the ratio of milliliters degradation-enhancing reactant to grams polymer to be at least 0.5; 0.6, 0.7, 0.8, 0.9, or 1.0. In still another preferred embodiment, the ratio of milliliters degradation-enhancing reactant to grams polymer is at in the approximate range of about 0.65 to about 0.75.

In one embodiment of the present invention, the degradation-enhancing reactant is capable of interacting with the polymer by participating, directly or indirectly, in an oxidation-reduction reaction. As such, in one aspect, solubilized polymer is oxidized to provide at least on degradation product. Therefore, in accordance with this aspect of the invention, the degradation-enhancing reactant can be any oxidizing agent recognized in the art.

Specific examples of suitable oxidizing agents include, without limitation, $H_2O_2$, $Fe^{+3}$, $Cu^{+2}$, $Ag^+$, $O_2$, $Cl_2$, $ClO^-$, $HNO_3$, $KMnO_4$, $K_2CrO_4$, $K_2Cr_2O_7$, $Ce(SO_4)_2$, $K_2S_2O_8$, $KIO_3$, ozone, peroxides and any combinations thereof.

In those embodiments employing hydrogen peroxide as an oxidizing agent, the strength of the hydrogen peroxide used may be at range of initial concentrations. For example, the concentration of the hydrogen peroxide can be at least 5%, 10%, 15%, 20%, 25%, 30%, 35%, 40%, 45%, 50%, 55%, 60%, 65%, 70%, 75%, 80%, 85%, 90%, or 95%. However, in a preferred embodiment, the hydrogen peroxide is commercially available 30–35% hydrogen peroxide. A specific example of hydrogen peroxide suitable for the application is commercially available as CAS No. 7722-84-1, and may be purchased from a number of sources including VWR Scientific Products, West Chester, Pa. 19380, Catalog No. VW 9742-1.

As discussed above, the degradation-enhancing reactant or a precursor thereof can be introduced into the aqueous environment. Furthermore, in an alternative aspect, the precursor to the degradation-enhancing reactant may already be present in an otherwise provided aqueous environment.

In other words, the degradation-enhancing reactant can be formed in situ or can be introduced directly in to the aqueous environment. For example, the precursor can be capable of free radical generation to form one or more degradation-enhancing reactants. In the embodiments employing hydrogen peroxide, the hydrogen peroxide is capable of forming hydroxyl radicals and/or molecular oxygen.

The process of the present invention involves treating the polymer(s) under conditions effective to degrading or otherwise breaking down the polymer into one or more degradation products. This aspect of the invention can include one or more component steps including solubilization of the polymer(s), formation of the degradation-enhancing reactants from the precursor(s) and/or reaction of the degradation-enhancing reactants with the polymer(s). These component steps can occur simultaneously, sequentially or in any combination.

For example, the polymer can be solubilized prior to, during, or after the introduction of the degradation-enhancing reactant to the aqueous environment. It is preferred that the polymer not be solubilized prior to introduction of the degradation-enhancing reactant/precursor. However, where the polymer is solubilized prior to introducing the degradation-enhancing reactant/precursor, the formation of the deg-radation-enhancing reactant from the precursor can occur at the same time as the degradation of the polymer.

The treatment step typically includes heating of the aqueous environment. To this end, the at least partial dissolution of the polymer as well as degradation of the solubilized polymer can be enhanced or facilitated by heating the aqueous solution.

Although the present invention is not limited to only those polymers that are soluble above a particular temperature, it is preferred that the aqueous environment be heated to a temperature of at least 180° F., alternatively at least 190° F., still alternatively at least 200° F., or even at least 210° F., alternatively at least 220° F., or even at least 230° F., or even at least 240° F. In one aspect, the aqueous environment is heated to a temperature within the approximate range of about 180° F. to about 250° F.

The precise apparatus and reactor used in heating the aqueous environment is not critical to the invention and depends on the nature of the environment itself.

It is not essential to the practice of this aspect of the invention whether the aqueous environment is heated before or after the degradation-enhancing reactant (or its precursor) is introduced, provided that the aqueous environment ultimately reaches a sufficient temperature for a sufficient period of time to provide the degradation-enhancing reactant(s). Likewise, it is also not essential whether the degradation-enhancing reactant is present in the aqueous environment before or after the polymer or material comprising a polymer is introduced into the aqueous environment provided that solubilized polymer and degradation-enhancing reactant are ultimately contacted within an aqueous environment under conditions effective to provide one or more degradation products.

In addition, the treatment step can optionally include agitation to facilitate the dissolution of the polymer or material comprising polymer. Thus, according to one aspect, the aqueous environment is agitated prior to, during or after introduction of the polymer. Furthermore, the polymer or material comprising a polymer can be agitated. In still another aspect, both the aqueous environment and the polymer or material are agitated. Likewise, in the same manner, agitation can also be used to aid in the interaction of the degradation-enhancing reactant with the solubilized polymer.

In those embodiments where the polymer is solubilized prior to introduction of the degradation-enhancing reactant/precursor, the formation of the degradation-enhancing reactant from the precursor can then be catalyzed by the use of heat, ozone, electromagnetic radiation, metallic catalysts or any combination thereof.

In a preferred aspect, formation of the degradation-enhancing reactant can be catalyzed by heat wherein the degradation-enhancing reactant is present in the aqueous environment and wherein the aqueous environment is at a temperature of at least 180° F., alternatively at least 190° F., alternatively at least 200° F., alternatively at least 210° F., alternatively at least 220° F., alternatively at least 230° F., alternatively at least 240° F. or even at least at least 250° F.

Alternatively, in such embodiments where the precursor to the degradation-enhancing reactant is an oxidizing agent, the oxidizing agent can be converted to or otherwise provide hydroxyl radicals and/or molecular oxygen by irradiating the aqueous waste stream with electromagnetic radiation. This process step results in a photochemical reaction predetermined as photolysis. Photolysis is chemical decomposition by the action of radiant electromagnetic energy. For example, the electromagnetic radiation is of a suitable wavelength and suitable intensity to photolytically convert an oxidizing agent, such as hydrogen peroxide, to hydroxyl free radicals.

One skilled in the art will appreciate that depending upon the wavelength of the commercially available ultraviolet lamps, and the chosen reactor design, the duration of irradiation required to affect substantially complete destruction of the polymer will vary, and some routine experimentation may be necessary. One of ordinary skill will also appreciate that in addition to variations in the characteristics of the electromagnetic radiation employed, variables of polymer concentration and concentration of oxidizing agent will result in variations of the duration of irradiation required to affect substantially complete destruction of the polymer, and some experimentation is necessary. For example, in certain embodiment, it can be preferred that the radiation be ultraviolet (UV), and conducted at a wavelength range of from about 4 nm to 400 nm, more preferably from about 180 nm to about 310 nm or most preferably between 180 and 190 nm.

In accordance with these embodiments, several methods may be used for effectively providing hydroxyl radicals in the aqueous environment. For example, as stated above, a treatment of hydrogen peroxide with suitable UV radiation can provide hydroxyl radicals. Alternatively, the aqueous environment can also be treated with suitable UV radiation alone. In still another embodiment, hydroxyl radicals can be produced from a treatment with suitable UV radiation and Fenton's Reagent. In still a further embodiment, hydroxyl radicals can also be produced by a treatment with suitable UV radiation and ozone or, even a treatment with suitable UV radiation, visible radiation, and peroxides.

The process of the present invention can also include "pretreatment" steps prior to introduction of the degradation-enhancing reactant or its precursor. The precise pretreatment steps depend on a number of factors including the polymer, the degradation-enhancing reactant and whether the polymer is solubilized prior to introduction of the degradation-enhancing reactant/precursor.

For example, the amount of solubilized polymer or material comprising a polymer may otherwise be provided in the aqueous environment in an acceptable or desired concentration. However, in another aspect of the invention, it may be desired to further increase the concentration of solubilized polymer or material comprising a polymer. Likewise, it may also be desired to introduce additional polymer or material comprising a polymer into the aqueous environment.

In another aspect of the present invention, it may be desired to increase the surface area of the polymer or material comprising a polymer in order to facilitate dissolution. Accordingly, any suitable technique known to one of ordinary skill in the art may be employed. For example, the polymer or material may be cut, torn, shredded, ripped, crushed, chopped, pulverized, homogenized, grinded or cryogenically grinded. Moreover, this can be done before or after the polymer or material comprising a polymer is introduced into the aqueous environment.

In those embodiments where the polymer is solublized prior to introduction of the degradation-enhancing reactant or precursor thereof, it may be desirable to filter non-solubilized material from the aqueous solution prior to introduction of the degradation-enhancing reactant or a precursor thereof.

Similarly, the process can also include "post-treatment" of the aqueous environment. The precise type of post-treatment can depend on the nature of the aqueous environment.

In general, where the polymer is degraded to a product including one or more organic acids, the acids can then be depleted through biodegrading the organic acids.

If the aqueous environment is to be biodegraded, the pH should be adjusted to a value within the approximate range of about 3.0 to about 10.0 or, more preferably, within the approximate range of about 5.0 to about 8.0 or, even most preferably, within the approximate range of about 6.0 to about 7.0 It is desired to pass the aqueous waste stream through a reverse osmosis unit after the biodegradation.

Biodegradation may include inoculating the aqueous waste stream with microorganisms such as aerobic, heterotrophic bacteria or anaerobic bacteria. The inoculated aqueous environment or waste stream may be exposed to an aerated, fluidized bed in a bioreactor which contains support materials such as pulverized, activated carbon or plastic bio beads. The inoculated aqueous waste stream may also be exposed to a fixed media reactor or an activated sludge process. Conventional extended aeration, step aeration, sequential batch reactions and contact stabilization may also be used to reduce the organic carbon content of the inoculated aqueous waste stream.

Preferably, the biological activity of the microorganisms can be enhanced by injecting a nutrient containing nitrogen, phosphorus, potassium or a trace mineral into the bioreactor. The final resultant waste stream includes neutralized water depleted of organic carbon, which is suitable for delivery to a waste treatment facility or for reuse or recycling.

In an alternative embodiment involving treatment of waste generated from nuclear facilities, a filtration and ion exchange process may be used to remove radioactive material from the solution.

For example, the step of removing radioactive material can be accomplished by filtering the solution through a micron filter which has a nominal pore size ranging between 10 and 100 microns to remove radioactive elements. Optionally, a second particulate filter having a nominal pore size between 0.1 micron and 1.0 micron, a reverse osmosis unit or an ion exchange unit consisting of an anion bed, a cation bed or an anion/cation combination bed that reduces depleted radioisotopes at an elemental level may also be used. Preferably, the waste stream may also be adjusted to a higher pH. More preferably, the pH adjusted waste stream can also be biodegraded to eliminate the organic acids. If the waste stream is to be biodegraded, it is preferable to neutralize the waste stream by adding sodium hydroxide until the pH is adjusted to within the approximate range of about 3.0 to about 10.0, preferably from about 5.0 to about 8.0 or, even more preferably from about 6.0 to about 7.0.

In an embodiment for treating materials that come from a source that may have been exposed to radioactivity, the potentially radioactive materials may be filtered.

The filtering can occur at any point in the process, e.g., prior to adding the degradation-enhancing reactant (e.g., an oxidizing agent), to the aqueous waste stream, after producing the degradation products (e.g., organic acids), from the polymer or after treatment of the degradation products, e.g., biodegrading the organic acids.

Filters for removing potentially radioactive material include particulate filters having a nominal pore size of 10 microns to 100 microns and optionally a second particulate filter having a nominal pore size of from 0.1 micron to 1.0 micron through which the waste stream is circulated. Filtering may also comprise circulating the aqueous waste stream through an ion exchange bed. For example, in one embodiment, the invention includes: (a) filtering potentially radioactive material from the aqueous waste stream; (b)

neutralizing the pH of the aqueous waste stream after producing organic acids; and (c) depleting organic acids from the aqueous waste stream after neutralizing the pH.

In one embodiment of the present invention, the aqueous environment is related to or may otherwise comprise biomedical wastes. In this regard, biomedical waste may comprise radioactive materials and/or biohazardous materials.

The term "biomedical waste" is intended to mean any waste that presents a threat of infection to humans, including non-liquid tissue, body parts, blood, blood products and body fluids from human and other primates; laboratory and veterinary waste which contain human disease-causing agents; discarded contaminated sharps, and used gloves, absorbent materials or disposable devices contaminated with regulated waste.

In order to more fully describe the invention, this disclosure will focus on one or more specific examples of processes. However, it should be appreciated that these sequences of steps are merely exemplary.

For example, one embodiment of the invention can be seen in connection a process including the steps of:

1) If required, introducing a polymer or polymer-containing material into an aqueous solution;
2) If required, adding a degradation-enhancing reactant, or a precursor thereof, to the solution;
3) Heating the aqueous environment so as to react the precursor to form the degradation-enhancing reactant, if necessary, and reacting the polymer to form degradation products;
4) Optionally, filtering non-solubilized material from the aqueous environment;
5) Optionally, measuring a parameter indicator of the concentration of polymer material in the aqueous environment;
6) Optionally, filtering material, e.g., radioactive material from the aqueous environment;
7) Optionally, altering, e.g., neutralizing, the pH of the aqueous environment; and
8) Optionally, biodegrading the resulting degradation products in the aqueous environment, e.g., organic acids form $CO_2$, $H_2O$ and biomass.

Steps 1) to 3) are discussed above. However, one suitable embodiment comprises heating the solution containing the water-soluble polymer and the degradation-enhancing reactant/precursor, e.g., oxidizing agent, at a temperature and length of time sufficient to dissolve the polymer and react the oxidizing agent. This is preferably accomplished by pressure-cooking water-soluble polymer solution in a bath of high-temperature water at a constant volume, such as by autoclaving. In a still more preferred embodiment, the vessel contains the water-soluble polymer solution and can be heated to a temperature in a range of between about 212° F. to about 250° Fahrenheit under saturation pressure. It is found that by pressure-cooking the solid polymer material in an aqueous solution, the pressurized conditions allow for achievement of higher solution temperatures than can be achieved in ambient air without boiling. The higher temperature of the solution transfers more heat energy to the solid polymer material, and the increased heat energy more effectively penetrates solid masses of polymer materials to dissolve them completely. Further, the higher temperatures of the autoclave achieve a sterilization of the waste stream that cannot be achieved at lower temperatures. The high temperature used in pressure-cooking the water-soluble polymer solution is sufficient to cause chemical decomposition of the oxidizing agent. For example, when the oxidizing agent is hydrogen peroxide, the high temperature is sufficient to produce hydroxyl radicals, molecular oxygen or a combination of both.

As to step 4), the aqueous environment is preferably filtered through strainers to remove any undissolved polymer material and non-water-soluble polymer constituents in the solution. In a preferred embodiment, the strainers will have a mesh size in an approximate range of between about 20 and about 50 mesh. In a more preferred embodiment, the strainers will have a mesh size of approximately about 30 mesh. Undissolved polymer material trapped in the strainers can be recirculated for final solubilization. In a preferred embodiment, polymer material will constitute an approximate range of greater than 0% to about 10.0% by weight in the solution. In a more preferred embodiment, polymer material will constitute an approximate range of between about 4.0% to about 6.0% by weight in the solution. In still a more preferred embodiment, polymer material will be present in an amount of about 5.0% by weight in the solution. Additionally, in the most preferred embodiment, the temperature of the solution during the filtration process step is maintained at or above about 150° F. to prevent precipitation of the PVA out of solution prior to its destruction.

As to step 5), the polymer can be destroyed by a reaction, e.g., an oxidation-reduction reaction that converts the polymer material into new and uniquely different organic compounds that do not exhibit the same physical or chemical characteristics of the original compound. The characteristics of these compounds can be used to determine the extent of the reaction. This step is only necessary when it is necessary to determine the progress or completion of the destruction of the polymer material in the solution.

For example, where the polymer is PVA and the degradation-enhancing reactant/precursor is hydrogen peroxide, the resultant solution will include water and acetic acid. Thus, the pH of the resultant solution will decrease measurably during PVA oxidation. The degree of completion of the reaction can be measured by the decrease of the pH of the solution. A complete reaction (complete destruction of the PVA in solution) can be indicated by a pH below at least about 6.0, alternatively below at least 5.0, or even below at least 4.0, still alternatively below at least 3.0 or even below at lest 2.0. Similarly, the corresponding decrease in the pH can be between about 1.0 units to about 6.0 units below the pH of the solubilized solution. In an alternative embodiment, the preferred decrease in pH is between about 2.7 units to about 3.9 units below the pH of the solubilized solution.

Alternatively, the destruction of PVA may be confirmed by colorimetric assay of the PVA concentration in solution. Measurement by calorimetric assay may also be done in combination with measurements of pH. Note Amended Assay by Joseph H. Finley, "Spectrophotometric Determination of Polyvinyl Alcohol in Paper Coatings," *Analytical Chemistry* 33(13) (December 1961), and the calorimetric iodine solutions taught therein, including a preferred solution using 12.0 g boric acid, 0.76 g iodine and 1.5 g potassium iodide per liter. Preferably, spectrophotometric measurement of the polyvinyl alcohol occurs at its absorption maximum of 690 nm. The assay may be completed by: placing 20.0 ml colorimetric iodine solution in cuvette; adding 0.5 ml sample; incubating the solution at 25° C. for five minutes. Spectrophotometric measurement can be made at the absorption maximum, 690 nm using a Hach DR2010 or Odyssey DR2500 spectrophotometer. Standard solutions of polyvinyl alcohol may be prepared and a standard curve prepared using up to 10.0% concentrations of PVA in solution. The calibration curve may be derived from the absorption values at 690 nm (at 25° C.) plotted against the quantity of PVA per assay.

Step 6) relates to the filtering and depletion of radioactivity in solution. This process step is optional and only applicable when the water-soluble polymer material contains potentially radioactive waste. This step may or may not be required, for example, at a nuclear facility. If the polymer material was exposed to radioactivity that affects the disposability of the solution, then this process step should be added. With the addition of this process step, a low-level radioactive waste management system is created. This waste management system can be used as an alternative approach to current dry active radioactive waste treatment methods.

The process step of removal of radioactivity typically occurs prior to biological degradation. A more detailed preferred embodiment of this process step includes the basic steps of:

a) filtration of the solution, and
b) ion exchange of the solution.

At nuclear facilities, radioactivity may be present in process fluids in both elemental and particulate form. Filtration of the solution removes radioactive particulates. In a preferred embodiment, the solution is passed through a particulate filter having a nominal pore size ranging approximately between about 10 and about 100 microns. In a more preferred embodiment, the solution is then passed through a second particulate filter having a nominal pore size ranging approximately between about 0.1 micron and about 1.0 micron.

The ion exchange step depletes the solublized radioactive species, or solublized elemental radioisotopes, that remain after micro filtration, making the solution suitable for disposal or further treatment. In a preferred embodiment, the solution is directed through an ion exchange vessel that contains ion exchange resin in the form of anion, cation bed or a combination thereof. During this process step, radioactive ions in solution will exchange places with the non-radioactive ions attached to the resin in solid form. The radioactive material collects on the resin, leaving the solution suitable for discharge or reuse as desired.

Step 7) relates to altering the pH of the solution. In one embodiment, the resultant organic acid solution is pH neutralized by addition of a base reagent. In a more preferred embodiment, sodium hydroxide is the base reagent used to raise the pH to an approximate range of between about 3.0 and about 10.0. In another more preferred embodiment, when the solution will be biologically treated such as described in the eighth process step (below), sodium hydroxide is the base reagent used to increase the pH to within an approximate range of between about 5.0 and about 8.0. It is believed that the sodium hydroxide combines with the acetate of the acetic acid in the solution to form a sodium acetate buffer, which is important to the biodegrading process step. In the most preferred embodiment, the pH of the resultant organic acid waste stream is neutralized to within an approximate range of between about 6.0 and about 7.0.

For all purposes of this application, the term "altering" refers to adjusting the pH while "neutralization" is intended to mean increasingly adjusting of the pH of an acidic solution to a more basic, less acidic, solution having a pH of approximately between about 3.0 and about 10.0.

Step 8) comprises the removal of dissolved and colloidal organic carbon compounds that remain in the aqueous stream after oxidation.

The neutralized solution of destroyed polymer material has a high carbon compound content that may render it unfit for discharge to sanitary sewer systems. Total organic carbon (TOC) is a direct measurement of the concentration of the organic material in solution. Biochemical oxygen demand (BOD) is a measure of the oxygen required for the total degradation of organic material and/or the oxygen required to oxidize reduced nitrogen compounds. Chemical oxygen demand (COD) is used as a measure of the oxygen equivalent of the organic matter content of a sample that is susceptible to oxidation by a strong chemical oxidant. One or more of these parameters are commonly used by publicly operated treatment facilities to regulate effluent waste streams.

Additionally, in instances where the polymer material may contain or have been exposed to radioactivity, it is possible that even after the micro filtration of particulate species and ion exchange depletion of the solubilized radioactive species, the neutralized solution may still contain a level of radioactive material such that the solution is undesirable for disposal or further treatment. Accordingly, depletion of the organic carbon material from solutions can further deplete residual radioactive species contained in the neutralized solution.

Biodegradation of the organic acids and other organic products in the solution is therefore used to (1) deplete and/or remove organic carbon compounds; and (2) further aid in the depletion of residual radioactive material. In this process step, the neutralized solution is inoculated with microorganisms. The microorganisms utilize the organic acids produced by the oxidation-reduction of the water-soluble polymer material as a carbon and energy source. In a preferred embodiment, the microorganisms are comprised substantially of aerobic, heterotrophic bacteria. These forms of bacteria are known to those in the art and are readily available. Treated-PVA Degradation Organisms may include:

*Arthrobacter ilicis*
*Bacillus amyloliquefaciens*
*Bacillus pumilus* GC subgroup B
*Bacillus subtilis*
*Brevibacterium nicbrellneri*
*Comamonas testosteroni*
*Flavobacterium resinovorum*
*Kocuria kristinae*
*Microbacterium liquefaciens*
*Micrococcus luteus* GC subgroup C
*Pseudomonas balearica*
*Pseudomonas chlororaphis*
*Pseudomonas putida* biotype A
*Pseudomonas pseudoalcaligenes*
*Rhodococcus equi* GC subgroup B All organisms may be purchased from Advanced Microbial Solutions, 801 Highway 377 South, Pilot Point, Tex. 76258. The following organisms may be purchased from the American Type Culture Collection, 12301 Parklawn Drive, Rickville, Md. 20852 (http://www.atcc.org):

*Arthrobacter ilicis*
*Bacillus amnyloliquefaciens*
*Bacillus pumilus* GC subgroup B
*Bacillus subtilis*
*Brevibacterium mcbrellneri*
*Comamonas testosteroni*
*Flavobacterium resinovorum*
*Kocuria kristinae*
*Microbacterium liquefaciens*
*Micrococcus luteus* GC subgroup C
*Pseudomonas chlororaphis*
*Pseudomonas putida* biotype A

*Pseudomonas pseudoalcaligenes*
*Rhodococcus equi* GC subgroup B

The aerobic, heterotrophic bacteria metabolize the organic acids in the solution, thus reducing the COD of the solution and rendering it dischargeable to sanitary sewer systems. A preferred Experimental Growth medium used in treated-PVA experiments for a healthy and sustainable bacteria population, per liter $H_2O$ comprises:

| | |
|---|---|
| Acetic acid | 0.5% |
| Molasses | 0.002% |
| $(NH_4)_2SO_4$ | 1.0 g |
| $KH_2PO_4$ | 1.0 g |
| $KH_2PO_4$ | 0.8 g |
| $MgSO_4\ 7\ KH_2O$ | 0.2 g |
| NaCl | 0.1 g |
| $CaCl_2\ 2H_2O$ | 0.2 g |
| $FeSO_4$ | 0.01 g |
| $Na_2MoO_4\ 2H_2O$ | 0.5 mg |
| $MnSO_4$ | 0.5 mg |
| Yeast extract | 10.0 g |

It is recommended to adjust the pH to within the approximate range of about 3.0 to about 10.0. In a more preferred embodiment, it is recommended to adjust the pH to about 7.5 and growing organisms at 25° C. In a more preferred embodiment, the solution is directed to a pulverized activated carbon (PAC) chamber comprising an aerated, fluidized bed of PAC. The pulverized carbon becomes a suspended substrate for bacterial growth. When the TOC is reduced to the desired level below local regulatory limitations, the biologically treated solution can be decanted and released for discharge.

Another embodiment of the invention can be seen in connection a process including the steps of:

1) If required, solubilizing water-soluble polymer material in an aqueous environment;

2) Filtering non-solubilized material from the aqueous environment;

3) Adding a degradation-enhancing reactant, or a precursor thereof, to the filtered environment;

4) Where a precursor of the degradation-enhancing reactant is employed, react the precursor to form the degradation-enhancing reactant, and reacting the polymer;

5) Optionally, measuring a parameter indicator of the concentration of polymer material in the aqueous environment;

6) Optionally, filtering material, e.g., radioactive material, from the aqueous environment;

7) Optionally, altering, e.g., neutralizing, the pH of the solution; and

8) Optionally, biodegrading the degradation products, e.g., organic acids in the solution to form $CO_2$, $H_2O$ and biomass.

This process differs from that previously discussed particularly in connection with steps 1)–5) which involve solubilization of the polymer prior to introduction of the degradation-enhancing reactant/precursor and formation of the degradation-enhancing reactant from the precursor. To this end, it has been discovered that those embodiments wherein the polymer is solubilized and reacted in the same solution reactor facilitates the treatment of aqueous environments having higher polymer concentrations and or solids content.

The step 1) of this embodiment preferably involves solubilization of water-soluble polymer material in an aqueous solution. In a more preferred embodiment, this step is accomplished by pressure-cooking water-soluble polymer waste material in a bath of high-temperature water at a constant volume, such as by autoclaving. In a still more preferred embodiment, the vessel contains the water-soluble polymer waste material and can be heated to a temperature in a range of between about 220° F. to about 250° F. under saturation pressure. It is found that by pressure-cooking the solid polymer material in an aqueous solution, the pressurized conditions allow for achievement of higher solution temperatures than can be achieved in ambient air without boiling. The higher temperature of the solution transfers more heat energy to the solid polymer material, and the increased heat energy more effectively penetrates solid masses of polymer materials to dissolve them completely. Further, the higher temperatures of the autoclave achieve a sterilization of the waste stream that cannot be achieved at lower temperatures.

The second process step in this preferred embodiment comprises filtration. After receiving a solubilized solution of polymer material, or alternatively, after solubilizing solid polymer material as described above, the solution is preferably filtered through strainers to remove any undissolved polymer material and non-water-soluble polymer constituents in the solution. In a preferred embodiment, the strainers will have a mesh size in an approximate range of between about 20 and about 50 mesh. In a more preferred embodiment, the strainers will have a mesh size of approximately about 30 mesh. Undissolved polymer material trapped in the strainers can be recirculated for final solubilization. In a preferred embodiment, polymer material will constitute an approximate range of greater than 0.0% to about 10.0% by weight in the solution. In a more preferred embodiment, polymer material will constitute an approximate range of between about 4.0% to about 6.0% by weight in the solution. In still a more preferred embodiment, the polymer material will be present in an amount of about 5.0% by weight in solution. Additionally, in still another preferred embodiment, the temperature of the solution during the filtration process step is maintain at or above about 150° F. to prevent precipitation of the PVA out of solution prior to its destruction.

Subsequent to introduction in step 3), step 4) can be performed in a variety of ways. One suitable embodiment of this step comprises irradiation of the solution with electromagnetic radiation. This process step results in a photochemical reaction predetermined as photolysis. Photolysis is chemical decomposition by the action of radiant electromagnetic energy. Ultraviolet radiation is electromagnetic radiation in the wavelengths from about 4 nanometers (nm), to about 400 nm. In a preferred embodiment, ultraviolet radiation between the wavelengths of approximately about 180 nm and about 250 m is used. In this process step, the exposure of the hydrogen peroxide in the solution to electromagnetic energy in the wavelengths of ultraviolet radiation, results in the photolysis of the hydrogen peroxide into hydroxyl free radicals (HO.) as shown in the following equation:

$$H_2O_2 + h\nu \approx 2HO.$$

where "h" represents Planck's constant ($6.6261 \times 10^{-34}$ joule-second), and "v" represents the frequency of the ultraviolet radiation. (HO.) is the hydroxyl free radical. The hydroxyl radicals present a very aggressive oxidizing environment in which the hydroxyl free radicals attack the organic constituents of the liquid stream, thereby initiating an oxidative cascade of reactions, including the complete destruction of the polymer material in solution. The components of the polymer material predominantly forms simple organic acids.

In another embodiment of the fourth process step, heat is used to convert the hydrogen peroxide in the solution into free hydroxyl radicals. The hydroxyl radicals present a very aggressive oxidizing environment in which the hydroxyl free radicals attack the organic constituents of the liquid stream, thereby initiating an oxidative cascade of reactions, including the partial or complete destruction of the polymer material in solution. The temperature needed to convert the hydrogen peroxide to hydroxyl radicals is at least 190° F. In embodiments using this heat to generate free hydroxyl radicals in the fourth process step, it is preferred that the second process step involving the filtration of the solution occurs after the conversion of hydrogen peroxide into free hydroxy radicals.

Based on the results of step 5), the degradation-enhancing reactant, e.g., oxidizing agent to the solution and irradiating the solution with ultraviolet radiation or heating to generate the free radical may be repeated until substantially all of the polymer material has been destroyed if that level of destruction is desired. It is believed that the oxidation-reduction reaction of PVA results in the formation of two equivalent forms of resonance stabilized acetate ion, and an increase in free hydrogen ions. An increase in hydrogen ion concentration in the solution increases the acidity of the solution. Thus, in the more preferred embodiment, the concentration of PVA remaining in solution subsequent to the process step of generating the free radical, can be measured by the incremental reduction of the pH of the solution.

The present invention also includes apparatuses and systems for performing the foregoing processes. While the following discussion will set forth examples of a reaction system in terms of one embodiment of the process and one polymer, PVA, it is to be understood that the present invention is not limited to this exemplary system.

In this regard, a suitable system for performing the second process discussed above is illustrated by FIG. 1, where the reference numeral 100 refers generally to a solution vessel. In a preferred embodiment, solution vessel 100 is an autoclave. Solution vessel 100 is preferably made of stainless steel or similarly corrosively resistant material. Solution vessel 100 is connected by a plumbing line 102 to a filter system 104. Filter system 104 is connected by plumbing line 106 to a pump 108. In a preferred embodiment, a plumbing line 112 intersects and connects plumbing line 110 to a heat exchanger 114. Heat exchanger 114 is connected by a plumbing line 116 back to solution vessel 100 to form a recirculating communication.

Pump 108 is connected by a plumbing line 110 to a photochemical reaction vessel 200. Reaction vessel 200 is preferably made of stainless steel or similarly corrosively resistant material. In a preferred embodiment, photochemical reaction vessel 200 is comprised of a bank of individual photochemical reactors (not shown) arranged in an array within the reaction vessel. In this embodiment, a mechanical mixer (not shown) is located within reaction vessel 200 to provide circulation of the contents. Each of the reactors comprising at least one high-intensity ultraviolet lighting element. In a more preferred embodiment, the photochemical reactors within reaction vessel 200 generate ultraviolet radiation in the wavelengths between about 185 and about 250 nanometers.

An oxidative agent injection system 300 is connected by a plumbing line 302 to reaction vessel 200. In a preferred embodiment, oxidative agent injection system 300 comprising a programmable logic controller, sensor, recorder, and dispensing mechanism, such as is well known in industrial chemistry. Photochemical reaction vessel 200 is connected by a plumbing line 202 to a pump 204. Pump 204 is connected by a plumbing line 206 to a neutralization vessel 400. In an optional embodiment, a plumbing line 208 intersects plumbing line 206 and is connected to reaction vessel 200 to permit pump operated re-circulating photochemical treatment of the solution.

A pH neutralizing system 402 is connected by a plumbing line 404 to neutralization vessel 400. In a more preferred embodiment, pH neutralizing system 402 comprising an automatic pH controller. Neutralization vessel 400 is connected by a plumbing line 406 to a pump 408. Pump 408 is connected by a plumbing line 410 back to neutralization vessel 400 to form a recirculating communication. Neutralization vessel 400 is connected by a plumbing line 412 to bio cells 500. Bio cells 500 are preferably of the fixed media aerobic type or activated sludge processes. Entrance accommodations are made for administration of air, microbes and nutrients to the bio cells by any means well known in the industry. Bio cells 500 are connected by a plumbing line 502 to a pump 504. Pump 504 is connected by a plumbing line 506 back to bio cells 500 to form a recirculating communication. Bio cells 500 are connected by a plumbing line 508 for discharge.

In an alternative preferred embodiment, a plumbing line 602 intersects and connects plumbing line 206 to a radioactive material filtration system 600. Radioactive material filtration system 600 is connected by a plumbing line 604 back to plumbing line 206 to form a circulating communication. Optionally, radioactive material filtration system 600 is connected by a plumbing line 606 back to reaction vessel 200 to form a recirculating communication by which depletion of radioactivity in solution can be performed coincident with oxidation-reduction of the solution. Radioactive material filtration system 600 may alternatively be connected within the disclosed system at any position between solution vessel 100 and neutralization vessel 400.

Secondary biological treatment is used for the removal of organic carbon from the processed aqueous environment. The preferred methods include using a fixed media reactor and an activated sludge process such as conventional extended aeration, step aeration, sequential batch reactions, contact stabilization, or fluidized bed reactors. When processed aqueous environment water should be maintained in a closed loop system, reverse osmosis can be used in addition to the above mentioned methods.

Figure 2:
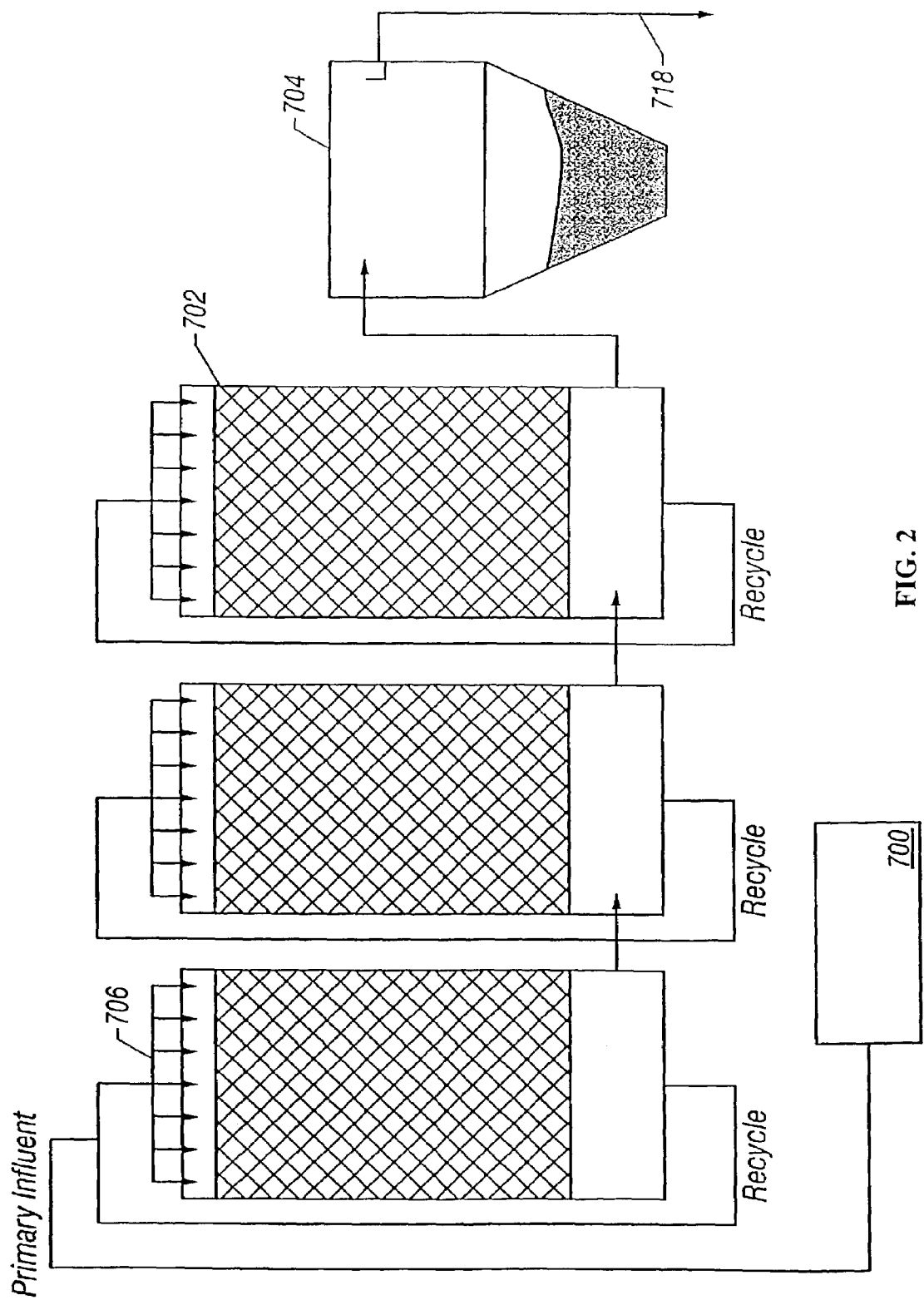
FIG. 2 is a process flow diagram of a fixed media bioreactor system.

An aerobic treatment process that consists of uniform distribution of wastewater over a fixed (i.e. stationary) media by means of flow distributor 706 within one or more vertical cells (FIG. 2). The media will be constructed of material that provides the greatest specific surface area and percent void space. Greater surface area permits a larger mass of bacterial biofilm per unit volume, while increased void space allows for higher hydraulic loadings and enhanced oxygen transfer.

A large portion of the wastewater applied to the fixed media passes rapidly through it to the secondary clarifier 704, while the remainder trickles slowly over the surface of a bacterial biofilm growing on the fixed media 702. Total organic carbon (TOC) removal occurs by biosorption and coagulation from the rapidly moving portion of the flow and by the progressive removal of soluble organic constituents from the more slowly moving portion of the flow through biochemical oxidation.

The quantity of bacterial biofilm produced is controlled by the available food, and the growth will increase as the organic load increases until a maximum thickness is reached or the mass organic loading exceeds the design fixed media surface area required for dissolved oxygen exchange. This maximum growth is controlled by hydraulic rate, type of fixed media, organic constituent, amount of essential nutrients present, and the nature of the particular biological growth. Retention time within the system is a function of influent hydraulic loading and cell recycle rate. In a fixed media reactor system, the re-circulation ratio is from 3:1 up to 5:1 (recycle to hydraulic load).

The major application of fixed media reactors in the treatment of a processed aqueous environment would be for high-strength, non-radioactive waste streams. Fixed media reactors may handle volumetric TOC loadings of 50 to 100-lbs./1,000 cu. ft. of media surface area and hydraulic loadings of 0.5-to 1.5-gpm/sq. ft. while achieving TOC removal rates of up to 90% (U.S. EPA, Technology Transfer, 1974).

The activated sludge process has been adapted into many wastewater treatment designs and is one of the best established and widespread biological wastewater treatment processes in the world for industrial wastewater, and its adaptability to accommodate new demands in effluent quality is significant (Burgess, et al, 2000). The activated sludge process uses microorganisms in suspension to biochemically oxidize soluble and colloidal organics such as the aqueous environment to carbon dioxide and water in the presence of molecular oxygen. During the oxidation process, a portion of the organic material is synthesized into new cells or biomass. A portion of the cells contribute to forming additional biomass (sludge) while other cells undergo auto-oxidation and are depleted. Oxygen is used in the process to support the oxidation and synthesis reactions. To operate any application of the activated sludge process on a continuous basis, the bio-solids generated must be separated prior to discharge of the decant portion with the major fraction being recycled to the aeration chamber, and the excess sludge being withdrawn for further handling and disposal.

Examples of activated sludge process design adaptations that may be used for secondary biological treatment within the context of this invention include: conventional extended aeration, step aeration, sequential batch reaction, contact stabilization and fluidized bed reactors.

Figure 3:
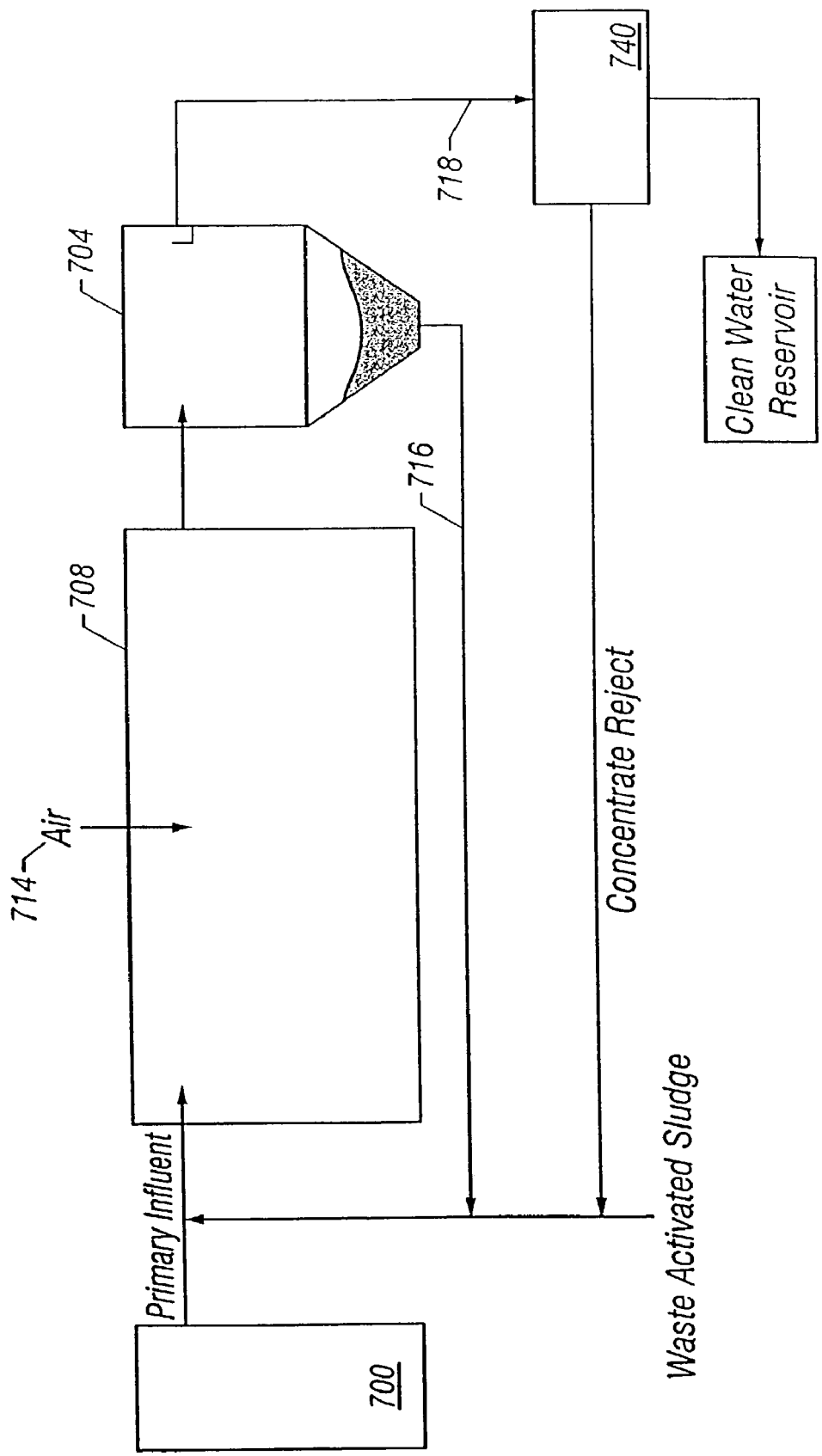
FIG. 3 is a process flow diagram for the activated sludge process of conventional extended aeration.

In a conventional extended aeration system used for secondary biological treatment of processed PVA, wastewater is pumped from primary processing 700 and pH control into an aerobically mixed aeration chamber 708 followed in series by a secondary clarifier 704 (FIG. 3). At the head end of the aeration chamber influent, wastewater is mixed with a split stream of return activated sludge 716. The design of the air distribution system within the chamber prevents short-circuiting of the waste stream across the unit and extends retention time by forcing the water to take the longest route through the chamber. Wastewater entry into the aeration chamber displaces mixed liquor (mixed water and biomass) into the secondary clarifier 704, where the flocculated biomass settles into sludge 716 and clarified final effluent 718. The treated water portion is discharged across a surface effluent layer.

The design of a conventional extended aeration system for the treatment of processed aqueous environment is based upon volumetric loadings of 20 to 40 lbs. TOC/day/1,000 cu. ft. of aeration chamber capacity and organic loadings (food to microorganisms, F/M) of 0.2 to 0.4 lbs. TOC/day/lb. mixed liquor suspended solids (MISS). Sludge retention time (SRT) may vary due to nutrient loading, but should normally range between 5 to 15 days for this process that may achieve 85 to 95 percent TOC removals with proper operation (U.S. EPA, Technology Transfer, 1974).

Figure 4:
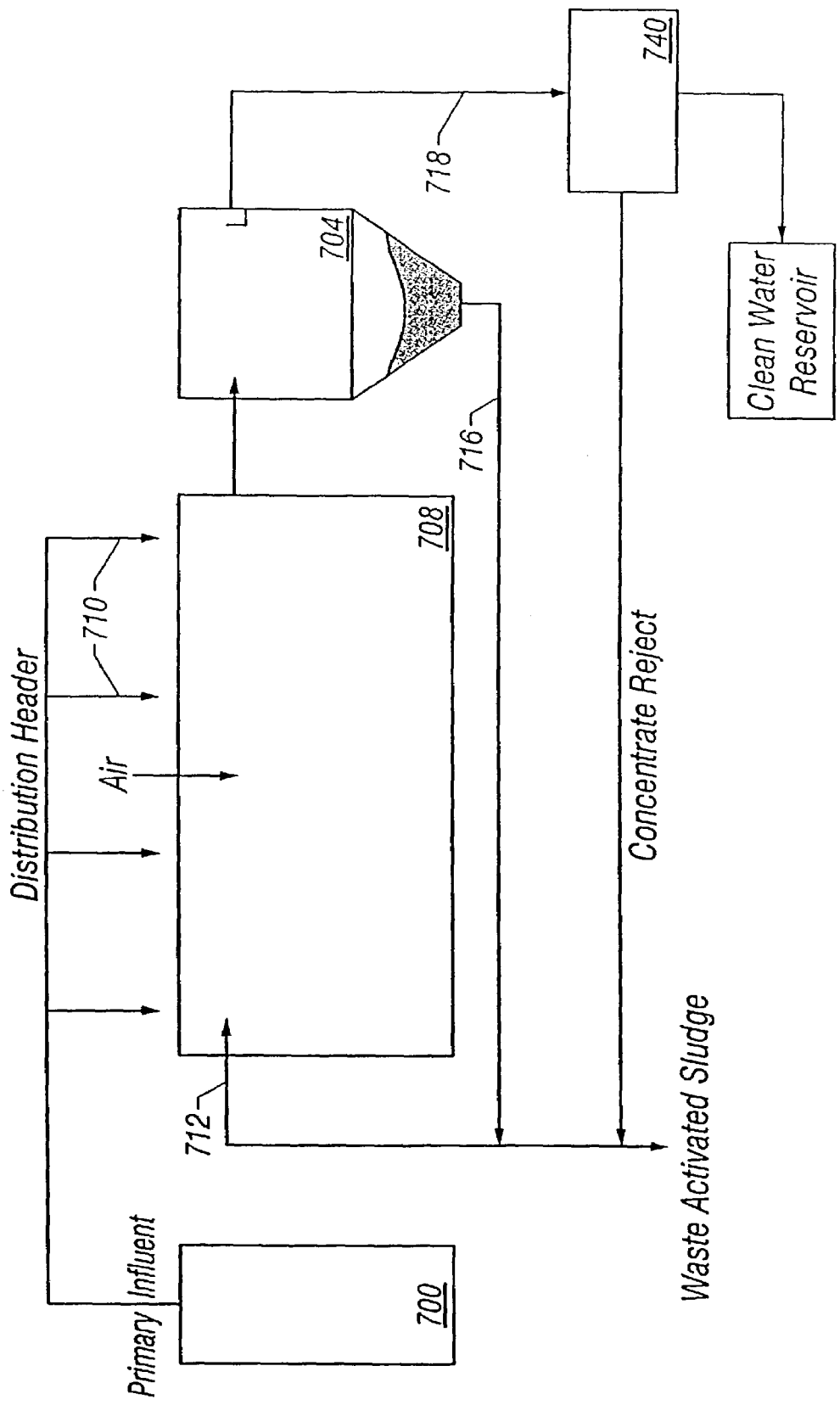
FIG. 4 is a process flow diagram for the activated sludge process of step aeration.

In a step aeration system a processed aqueous environment, e.g., a waste stream, is introduced at several points 710 along the aeration chamber (FIG. 4). However, the return activated sludge 716, which normally ranges from 25 to 75 percent of the design flow, is introduced at the head end of the first aeration chamber 712 as in the conventional extended aeration system. This permits a more efficient utilization of the activated sludge biomass and an even distribution of oxygen demand throughout the chamber.

Step aeration systems are designed for volumetric loadings of 40 to 60 lbs. TOC/day/1,000 cu. ft. of aeration chamber capacity at organic loadings (food to microorganisms, F/M) of 0.2 to 0.4 lbs. TOC/day/lb. MLSS. The sludge retention time (SRT) again may vary depending on nutrient addition, but in general should be similar to those of the conventional extended aeration systems (U.S. EPA, Technology Transfer, 1974).

Figure 5:
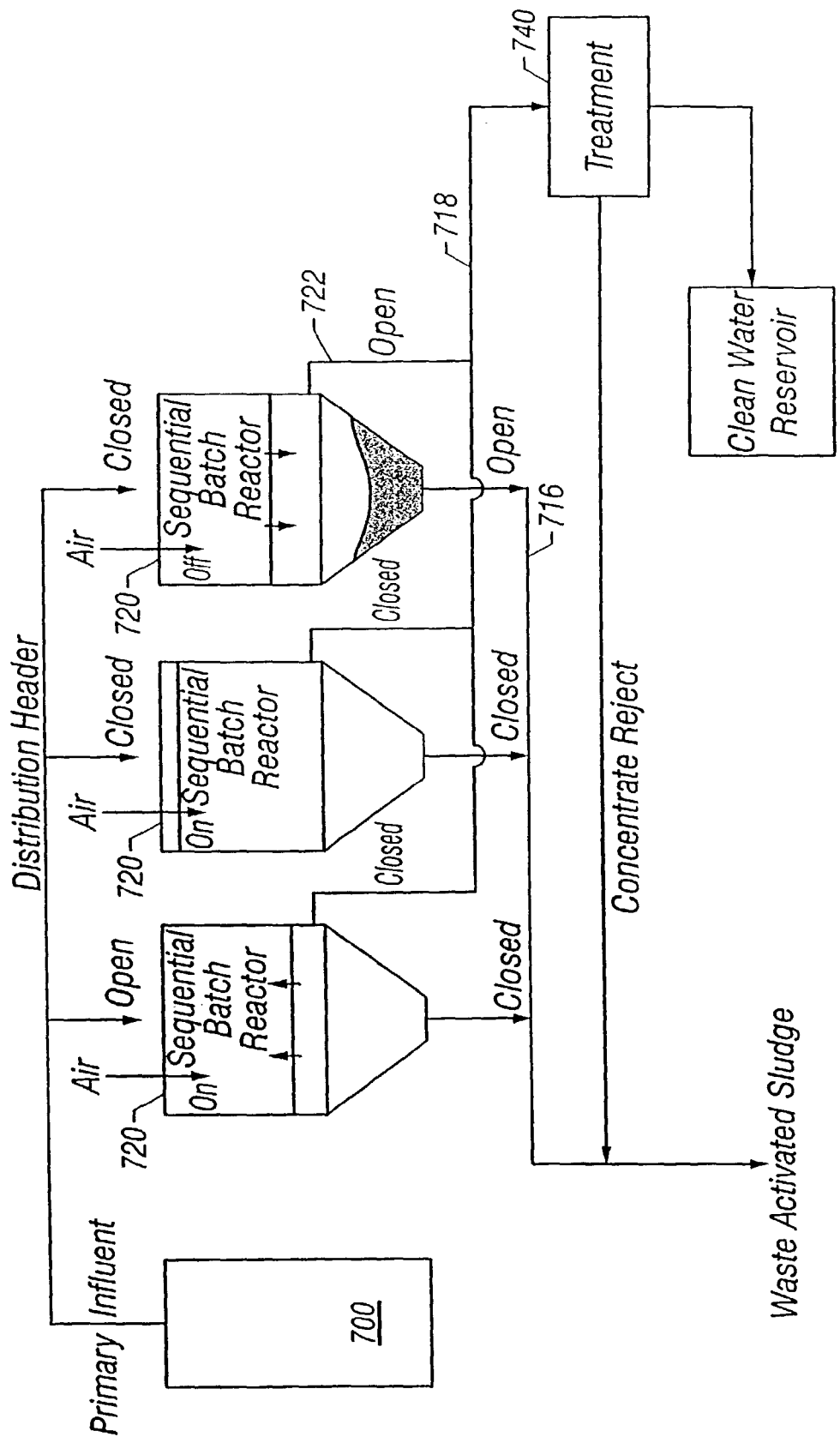
FIG. 5 is a process flow diagram for the activated sludge process of contact stabilization.

A sequential batch reaction system is an activated sludge process where two or more aerobic bioreactors 720 are sequentially filled, organic loading biochemically oxidized, and decant discharged from each discrete unit 722 (FIG. 5). This design eliminates the need for a separate clarifier chamber, therefore, reducing the overall footprint of the treatment plant. Typically in a sequential batch reaction system, the aerobic bioreactors will alternate between accumulation/digestion and settling/decant discharge. For the treatment of processed PVA waste streams, the sequential batch reactors may be operated in series in an effort to step down the organic carbon loading incrementally along the treatment train. In addition, treatment employing this process operation is performed in isolated batches as opposed to other designs that utilize some form of flow through system. As a result, sequential batch reaction treatment of processed PVA waste streams permit the manipulation of operating parameters, such as detention time, for each individual batch of wastewater as it is moved through the system.

In sequential batch reaction systems, the design volumetric loadings are similar to those of a conventional extended aeration system where processed PVA may be treated at a rate of 20 to 40 lbs. TOC/day/1,000 cu. ft. of aeration chamber capacity and organic loadings of 0.2 to 0.4 lbs. TOC/day/lb. MLSS.

Figure 6:
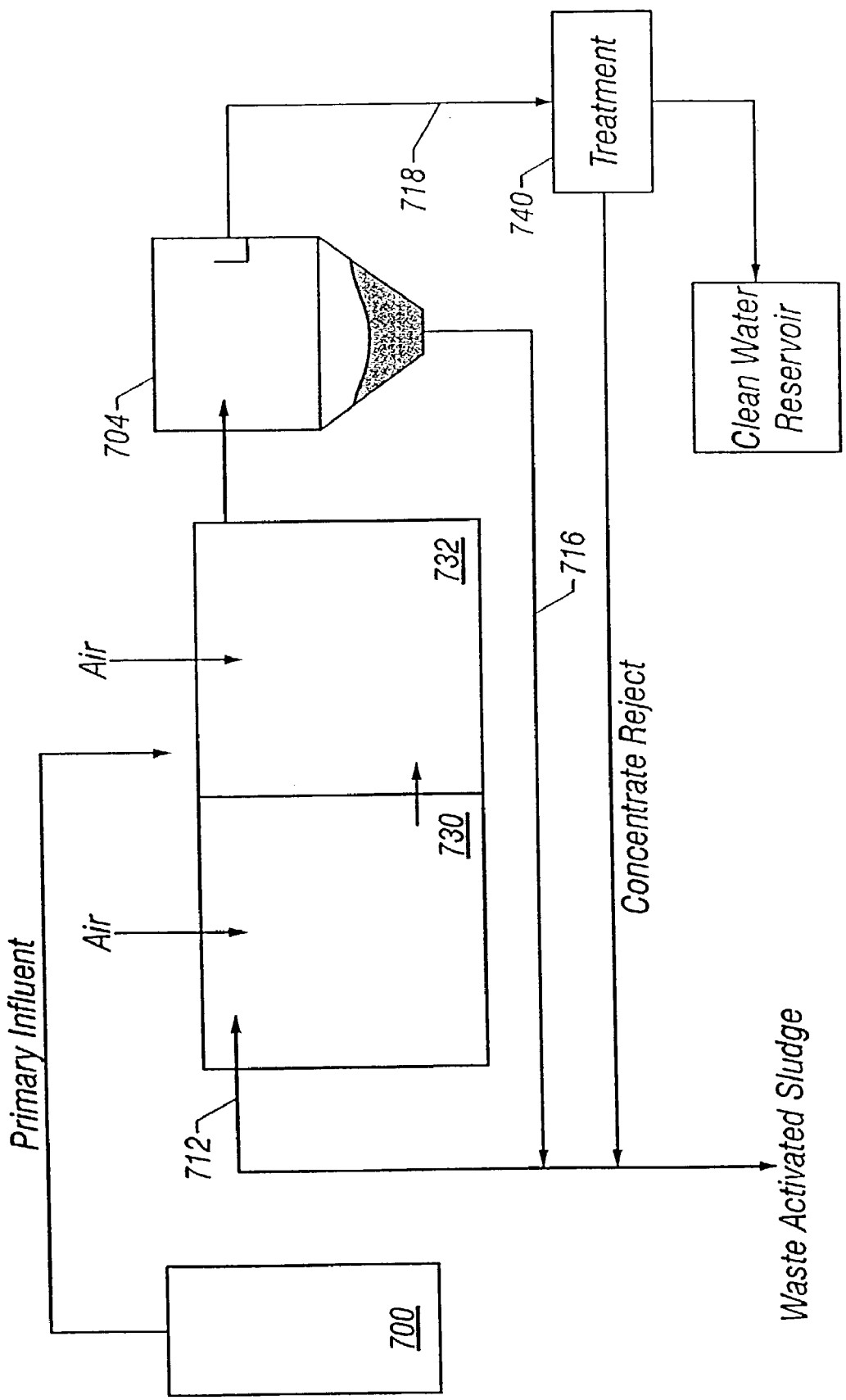
FIG. 6 is a process flow diagram for the activated sludge process of a sequential batch reaction.

As in step aeration, the difference between conventional extended aeration and contact stabilization involves a change in the feed location of influent processed PVA and sludge return 712 to the aeration chamber (FIG. 6). Volumetric TOC loadings, F/M, SRT, and organic removal efficiency are similar to those of the step aeration system. Sludge return ratios vary from 25 to 100 percent of the average design flow.

The contact stabilization system design consists of a reaction aeration chamber 730, contact aeration chamber 732, and a secondary clarifier 704. In this design the processed PVA wastewater loading of colloidal or insoluble state TOC is rapidly removed from the waste stream in a relatively short contact time by the combined mechanism of biological sorption, synthesis, and flocculation. This may offer the possibility of a reduction in plant size per unit of processed PVA wastewater treated as long as the waste stream exhibits these characteristics. In the contact stabilization system design, after the biological sludge 716 is separated from the wastewater 718 in the clarifier 704, the concentrated sludge is transferred to, and separately aerated in, the reaction aeration chamber 730. Here the flocculated and absorbed TOC is stabilized. The contact stabilization process has the advantage of being able to handle greater shock organic and toxic loadings because of the biological buffering capacity of the reaction aeration chamber 730, and the fact that at any given time the majority of the activated sludge 716 is isolated from the main stream of the plant wastewater flow.

A fluidized bed reaction process is one where a suspended medium such as activated carbon or plastic bio balls are incorporated into the bioreactor, aeration, and or reaction/contact chambers to provide additional surface area for the purpose of growing bacterial biofilm. This modification may be adapted to any of the activated sludge processes previously described (FIGS. 3–6). The advantage of fluidized bed reactors over conventional activated sludge designs is their ability to grow a wider, more diverse consortium of bacteria fixed to the suspended medium as well as those dispersed in suspended flock throughout aqueous phase of the aeration chamber. When activated carbon is utilized as the fluidizing medium, it provides adsorption properties that may buffer the affects of organic or toxic shock loads. Because of mechanical pumping and settling limitations bio balls as a fluidized bed medium are best suited in a sequential batch reaction application where all phases of treatment are performed within a single reactor.

Due to their ability to buffer high organic loads, fluidized bed reactor systems are designed for volumetric loadings of 40 to 60 lbs. TOC/day/1,000 cu. ft. of aeration chamber capacity at F/M ratios of 0.2 to 0.5 lbs. TOC/day/lb. NMSS. The SRT again may vary depending on nutrient addition, but in general should be similar to those of the conventional extended aeration systems.

Once again the goal of secondary and tertiary treatment processes within the context of this invention is to incrementally remove the organic carbon remaining in solution after the primary processing of PVA. Through the proper adaptation of secondary biological treatment it is possible to effectively remove 80 to 95 percent of that organic carbon from solution. However, in cases where processed PVA water must be maintained in a closed loop system all remaining organic carbon will have to be removed. When total removal of organic carbon is required the effluent water 718 from secondary biological treatment will be processed in a tertiary reverse osmosis system 740.

Osmosis is a term that describes the phenomenon of water flow through a semi permeable membrane that blocks the transport of salts or other solutes through it. When a semi permeable membrane separates two water volumes, water will flow from the side of low solute concentration, to the side of high solute concentration. The flow may be stopped or reversed by applying pressure on the side of higher concentration. When this process is preformed it is referred to as reverse osmosis (Lachish, 2000). The reverse osmosis concept will be incorporated into the invention treatment train by first be prefiltering the secondary effluent water 718 through a particulate filter (0.65 to 10 micron) to remove any suspended solids. After pre-filtering the water is transferred to a reverse osmosis (RO) concentrate tank. At this stage a high-pressure pump is utilized to pump water from the concentrate tank to the RO filter where it moves tangentially across the surface of the RO membrane. The applied pump pressure serves to force a portion of the water through the membrane to the permeate side. Salts and organic solutes to large to pass through the membrane pores are retained as concentrate and swept off the upstream side of the membrane by the tangential pressure flow (Millipore, Pellicon, and Proflux-Millipore Corp. 1999) This action prevents their buildup on the surface of the membrane and reduces potential plugging. In a typical operation 10 to 20 percent of the water filters through the RO membrane as filtrate with each pass while the remaining 80 to 90 percent is rejected and returned to the concentrate tank. With each pass or cycle the concentrate tank volume is reduced until it reaches about 10 percent of the initial batch volume.

Filtrate water free of salts, radioisotopes and TOC will be pumped to a clean water reservoir or tank for use in future PVA processing. The concentrate water will be transferred to the waste sludge holding chamber. Here it will be mixed and aerated with wasted bio-solids. As a result, additional biochemical oxidation/stabilization of TOC will take place prior to final de-watering and disposal of the solid radioactive residue and wasted dry bio-solids.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is degrees C or is at ambient temperature, and pressure is at or near atmospheric.

The term amount of a compound or property as provided herein means that such amount as capable of performing the function of the compound or property for which an amount is expressed. As will be pointed out below, the exact amount required will vary from process to process, depending on recognized variables such as the compounds employed and the processing conditions observed. However, an appropriate amount mat be determined by one of ordinary skill in the art using only routine experimentation.

Example 1

An aqueous solution comprising approximately 5% polyvinyl alcohol was prepared by introducing 210 grams of PVA and 4000 ml of water into a solution reactor. 168 ml of commercially available 30%–35% hydrogen peroxide was then introduced into the solution and the solution was heated to a temperature of about 190° F. to 220° F. The PVA concentration was then monitored hourly to track the progress of the reaction. After a period of approximately two hours, the resulting PVA concentration was measured to be 0.004%.

Example 2

An aqueous solution comprising approximately 8% polyvinyl alcohol was prepared by introducing 320 grams of PVA and 4000 ml of water into a solution reactor. 256 ml of commercially available 30%–35% hydrogen peroxide was then introduced into the solution and the solution was heated to a temperature of about 212° F. to 220° F. The PVA concentration was then monitored hourly to track the progress of the reaction. After a period of approximately 3 hours, the resulting PVA concentration was measured to be 0.028%.

Example 3

An aqueous solution comprising approximately 12% polyvinyl alcohol was prepared by introducing 480 grams of PVA and 4000 ml of water into a solution reactor. 380 ml of commercially available 30%–35% hydrogen peroxide was then introduced into the solution and the solution was heated to a temperature of about 200° F. to 225° F. The PVA concentration was then monitored hourly to track the progress of the reaction. After a period of approximately three hours, the resulting PVA concentration was measured to be 0.02%.

Example 4

An aqueous solution comprising approximately 16% polyvinyl alcohol was prepared by introducing 320 grams of PVA and 2000 ml of water into a solution reactor. 256 ml of commercially available 30%–35% hydrogen peroxide was then introduced into the solution and the solution was heated to a temperature of about 210° F. to 230° F. The PVA concentration was then monitored hourly to track the progress of the reaction. After a period of approximately two hours, the resulting PVA concentration was measured to be 0.036%.

Example 5

An aqueous solution comprising approximately 20% polyvinyl alcohol was prepared by introducing 400 grams of PVA and 2000 ml of water into a solution reactor. 260 ml of commercially available 30%–35% hydrogen peroxide was then introduced into the solution and the solution was heated to a temperature of about 215° F. to 240° F. degrees. The PVA concentration was then monitored hourly to track the progress of the reaction. After a period of approximately two hours, the resulting PVA concentration was measured to be 0.562%.

Example 6

An aqueous solution comprising approximately 24% polyvinyl alcohol was prepared by introducing 480 grams of PVA and 2000 ml of water into a solution reactor. 336 ml of commercially available 30%–35% hydrogen peroxide was then introduced into the solution and the solution was heated to a temperature of about 200° F. to 240° F. The PVA concentration was then monitored hourly to track the progress of the reaction. After a period of approximately two hours, the resulting PVA concentration was measured to be 0.014%.

The results for Examples 1 through 6 can be found in Table 1 (FIG. 7).

Example 7

A solution vessel 100 is preferably an autoclave made of stainless steel or similarly corrosively resistant material. Waste solid water-soluble polymer material is placed into solution vessel 100 in an aqueous solution. Preferably solid waste water-soluble polymer material is added to water to form a solution containing polymer material in an approximate range of between greater than 0.0% and about 5.0% by weight. In a more preferred embodiment, solid waste water-soluble polymer material is added to the solution in an approximate range of between about 0.5% and about 2.5% by weight. Preferably, solution vessel 100 maintains sufficient pressure to allow heating of the aqueous solution to a temperature in excess of 212° F. More preferably, solution vessel 100 maintains sufficient pressure to allow heating of the aqueous solution to a temperature in an approximate range of between about 220° F. and about 250° F. These parameters are normally automatically controlled and monitored. The solution is held at a designated temperature for a predetermined amount of time to allow the polymer material garments and other articles to dissolve and to assure complete sterilization of the solution.

After solubilization, the aqueous solution is then transferred to filter system 104. Preferably, filter system 104 comprises a plurality of strainers to strain out any undissolved polymer material, which will ultimately be dissolved as a result of the abrasion and turbulence created by the recirculation of the polymer material solution. Filter system 104 also strains out any non-soluble material that is incompatible with the process.

After filtration, the aqueous solution is then transferred to heat exchanger 114 which is preferably air-cooled, to accelerate the reduction in the temperature of the solution. After recirculation to solution vessel 100, the cooled solution is returned to ambient pressure. In preferred embodiment, as the solution is transferred to photochemical reaction vessel 200, the temperature of the solution is maintained within an approximate range of between about 150° F. and about 200° F.

When the water-soluble polymer material has been solubilized, and the aqueous solution has been filtered and cooled, it is transferred to photochemical reaction vessel 200. An oxidative agent injection system 300 supplies hydrogen peroxide to the aqueous solution circulating within photochemical reaction vessel 200. The hydrogen peroxide mixes with the aqueous solution in photochemical reaction vessel 200. Preferably, oxidative agent injection system 300 comprising an automatic rotometer and pH recorder. In a preferred embodiment, concentrated hydrogen peroxide is injected at a minimum rate of approximately 100 milliliters per 10 gallons of solution.

Preferably, photochemical reactor 200 comprises an array of tubes having core elements mounted coaxially therein for the generation of electromagnetic radiation. Preferably, the elements generate ultraviolet radiation in wavelengths in an approximate range of between about 185 and about 310 nanometers. More preferably, the elements generate ultraviolet radiation in wavelengths in an approximate range of between about 185 and about 250 nanometers. In the most preferred embodiment, the aqueous solution circulates in photochemical reactor 200, which contains a number of spaced ultraviolet elements, each having a quartz shield surrounding an ultraviolet core element. The solution is thus continuously irradiated by ultraviolet radiation while being mechanically blended, or recirculated. Exposure of the hydrogen peroxide in the solution to electromagnetic energy in the wavelengths of ultraviolet radiation results in the photolysis of the hydrogen peroxide into hydroxyl free radicals (HO.). The hydroxyl free radicals attack the organic constituents of the solution, initiating an oxidative cascade of reactions, which includes the complete destruction of the polymer material in the solution, and results in an organic acid waste stream comprising water and acetic acid. The increase in hydrogen ion concentration resulting from the oxidation reaction causes a decrease in the pH of the solution. Preferably, the pH of the solution is measured as the parameter indicator of the concentration of polymer material remaining in the solution. Measurement of the pH of the solution is preferably performed by oxidative agent injection system 300. In this manner, oxidative agent injection system 300 can control the continuation of the photochemical process until the pH is incrementally reduced to a level that indicates all polymer material in the solution has been destroyed.

Example 8

An alternative embodiment provides for the optional depletion of radioactive material in the solution. Again, note FIG. 1. This is accomplished by circulation of the solution through radioactive material filtration system 600 prior to transfer of the solution to neutralization vessel 400. Preferably, radioactive material filtration system 600 comprising a micron filter which removes radioactive particulate matter, and an ion exchange unit that reduces depleted radioisotopes at an elemental level. In a more preferred embodiment, the micron filter is composed of an approximately less than 1.0 micron cartridge filter. Test results related to this embodiment appear in Table 2 (FIG. 8).

Example 9

Still another alternative embodiment provides for the optional neutralization of the pH of the aqueous solution. Again note FIG. 1. When the reduction in the pH of the solution indicates that substantially all of the polymer material in the solution has been destroyed, the solution is transferred to neutralization vessel 400. A pH neutralizing system 402 injects sodium hydroxide into neutralization vessel 400 as an agent to raise the pH to a more alkaline state. Preferably, pH neutralizing system 402 comprising an automatic pH controller that proportionally injects sodium hydroxide to increase the pH until the desired pH is achieved, and controls the recirculation of the solution through neutralization vessel 400. In a preferred embodiment, the pH is neutralized to within an approximate range of between about 3.0 and about 10.0. In a more preferred embodiment, the pH is adjusted to within an approximate range of between about 5.0 and about 8.0. In still another embodiment, the pH is neutralized to within an approximate rnge of between about 6.0 to about 7.0.

Example 10

Another alternative embodiment provides for the optional degradation of the organic acid waste remaining in the aqueous solution. After the solution reaches an acceptably neutral pH, it is transferred to bio cells 500 (See FIG. 1) where the organic compounds remaining in the aqueous solution are metabolized. Bio cells 500 are preferably fixed media aerobic bioreactors inoculated with microorganisms comprised substantially of aerobic, heterotrophic bacteria. Preferably, to maximize efficiency of the biological process, treated water is recirculated before moving to the next cell. More preferably, the recirculation mixture ratio is about 5 to about 1, such that for every gallon added to a cell, five gallons is circulated and sprayed over the fixed media to create detention time within the cell. Transfer from cell to cell and discharge may be accomplished by wet well volumetric displacement and gravity flow. The bacteria metabolize the excess carbon in the solution until the solution is suitable for discharge as defined by the regulatory requirements of the local sanitary sewer system, or other final disposal system.

Example 11

One may use the equipment equivalent to that of FIG. 1, and find, as did applicants, that processing of contaminated solutions containing varying amounts of PVA in different acidic or basic solutions results in a substantial lowering of pH upon completion (about 2.8–5.2 hours, depending on wavelength used to irradiate solution and the concentration of $H_2O_2$ and other variables) with the pH change in the approximate range of between about 2.0 units to about 6.0 units.

Example 12

Treatment methods have been developed for the destruction of polyvinyl alcohol. These methods were derived based on a need for conversion and subsequent destruction of waste materials manufactured from PVA. PVA can be manufactured in various forms including film, non-woven and woven fabrics, etc. These PVA materials can be fashioned into many consumer products. The products can be used as substitute products in many industries. These consumables end up as waste materials and are costly to treat and dispose of by conventional means. PVA is a documented biodegradable polymer. However, testing indicates that the biodegradability rate is limited and not likely to be commercially viable.

Recognizing the utility in this product and the potential applications in various industrial markets, i.e., those involving hazardous waste materials, a cost effective means was developed to treat PVA based materials following useful life that would benefit the waste generator economically and provide a better environmental solution to bulk landfilling and even incineration processes. Testing and research led to several commercially viable technologies to treat PVA-based waste. One method for the destruction of water soluble polymers includes the steps of:

placing the waste stream containing the water soluble polymer in the solution tank;
Adding water;
Heating the tank contents to at least approximately 180° F.;
Holding the elevated temperature for at least 30 minutes;
Cooling the tank contents to a temperature less than approximately 180° F.;
Transferring the contents to the reaction tank (assumes a polymer goes into solution in a concentration within the range of greater than 0% to approximately 5%);
Adding appropriate amount of hydrogen peroxide;
Irradiating the solution with ultraviolet radiation for a relative period of time; and
Evaluating the results, if desired.

For this method, the concentrated PVA solutions (greater than approximately 5% PVA) are susceptible to precipitation and tend to come out of solution if agitated or moved. The PVA materials begin to solubilize at 180° F. and form true solutions when the temperature reaches 230° F. 1000–3000 mg/l hydrogen peroxide per 10000 mg/l PVA solution is preferred as an oxidation catalyst for efficient destruction of PVA in solution wherein efficient destruction is defined as greater than approximately 90% destruction of the polymer. It has been found that a combination of hydrogen peroxide and UV radiation is an efficient means by which to degrade PVA in solution. UV radiation at a wavelength of 180–190 nm is most efficient although wavelengths from 180–310 nm will produce positive results. Acetic and formic acids are the two primary photolytic products, however, a large number of organic intermediates are formed during photolysis as well.

Example 13

Another treatment method developed for the destruction of polyvinyl alcohol provides for the simultaneous dissolution of PVA and production of hydroxyl radicals, and includes the steps of—

Placing the water soluble polymer in solution tank;
Adding the hydrogen peroxide to the solution tank;
Adding water;
Heating the tank contents to a temperature of at least approximately 180° F.;
Holding an elevated temperature for at least 30 minutes; and
Cooling the tank contents to a temperature less than approximately 180° F.

PVA solutions preferably from 0–30% concentration by weight may be effectively managed by this method. The steps of adding the water soluble polymer, hydrogen peroxide and water to the solution tank may be performed in any order. 1000–3000 mg/l hydrogen peroxide per 10000 mg/l PVA concentration are required for efficient destruction, wherein efficient destruction is defined as greater than approximately 90% destruction of the polymer. Temperatures greater than approximately 190° F. are preferred in conjunction with hydrogen peroxide to efficiently destroy the PVA. For this method, no UV irradiation is required; heating the solution containing hydrogen peroxide is sufficient to create the hydroxy radicals necessary for the destruction of the PVA. Acetic acid, formic acid, and a large number of organic intermediates are the degradation byproducts of this reaction. Additionally, by not requiring the transfer of the treated polymer solution to a separate reaction tank the process can efficiently be carried out with a higher solids content and/or a more concentrated polymer solution.

Example 14

While PVA is soluble in water, at concentrations greater than 1% accompanied by temperatures less than 150° F., any movement or mixing of the liquid can cause PVA to resolidify from solution. This characteristic has created significant obstacles for disposal of PVA waste streams. To overcome this physical/chemical characteristic, the following treatment process was developed to destroy PVA in solution, as demonstrated in the reaction data depicted in Tables 2 and 3 (FIGS. 8–9). The principles of the present invention were affirmed by successful testing both in a lab, and through large-scale, on-site testing at a nuclear facility, with the results shown on the appended table.

Step 1. Solution Phase. A predetermined weight of contaminated PVA material is added to a specified volume of water so that a solution of specific percent concentration may be created. For the purpose of these data sets, that concentration was either 0.5% by weight in the test runs indicated below (1101-02C)–(1111-D), or 2.0% by weight in test runs (1112-D)–(1117-D). (See Table 2; FIG. 8.). After addition of PVA and water, the solution vessel was secured and heated to a temperature of 230° F., at a pressure of 5–7 psi for 30 minutes. In previous testing, it had been determined that all PVA would be driven into solution under these conditions, leaving only the radioactive contaminants and non-PVA solids.

Step 2. Cool Down Phase. After heating, the solution was allowed to cool down to a temperature range of between about 130° F. to about 180° F. For safety, the pressure was monitored and the vessel was vented prior to transfer.

Step 3. Transfer Phase. When a safe temperature and pressure was achieved, the PVA solution was pumped through 30 mesh strainers to a solution reactor. In this phase, non-PVA solids were removed from the solution. This step is necessary prior to the reaction phase to reduce the carry-over of suspended solids that would reduce transmittance of ultraviolet radiation in the reaction phase. Some care had to be taken during the transfer phase to gently mix the solution so that all the undissolved material remained in suspension. This was necessary to prevent a buildup of radioactive contaminants in the solution vessel from batch to batch. The system strainers would be cleaned between batches when the pressure differential between the strainer inlet and outlet exceeded 75% of the maximum rated output head pressure of the transfer pump—

Step 4. Reaction Phase. The reaction phase involves recirculating the strained PVA solution through a photochemical reactor after first injecting it with hydrogen peroxide. The apparatus used in generating the data sets depicted in Table 2 include:

15 gallon cone-bottom solution reactor vessel
2 GPM recycle pump
2 gallon UV reactor containing an 189 nm element with a total ultraviolet output of 19.3 watts
Reagent metering pump with a maximum output of 2 GPD for the addition of hydrogen peroxide
Recording pH meter to measure and record the acidification reaction
Sample taps for the monitoring of PVA assay, temperature and solution conductivity Once the solution reactor and UV chamber had filled to an operating level, the UV reactor was turned on to allow it to warm up. Following this, the hydrogen peroxide metering pump was started. The metering pump drew from a flask containing a predetermined volume of 30% hydrogen peroxide so that over a period of 4 hours, the PVA solution would be injected with a precise dose. After beginning the injection of hydrogen peroxide, the solution reactor recycle pump was started and PVA solution mixed with metered amounts of hydrogen peroxide would circulate from the solution reactor vessel through the UV reactor chamber and back to the solution reactor. The UV irradiation of the solution resulted in the photolysis of the hydrogen peroxide dissolved in the solution, forming hydroxyl free radicals. The hydroxyl free radicals are an extremely aggressive oxidizing agent which attack and reduce the PVA through an oxidative cascade of reactions, resulting in the complete conversion of the polyvinyl alcohol in the solution to organic acids. This reaction resulted in an acidification of the solution that was tracked on the recording pH meter. This was an indication that the PVA in the solution had been destroyed. At that point, a sample was drawn and an assay performed to check for PVA residual. In this assay, a vial of indicator solution was injected with a predetermined amount of sample and then after mixing, compared to a standard blank. If no color change was observed between the sample vial and the standard blank, the reaction was complete and no PVA remained in solution. The actual UV contact time during the total reaction period was calculated based on the relative volumes of each individual batch being reacted and the capacity of the UV reactor. Based on that ratio, it was determined that the average contact time for batches 1101-02C–1111D was 2.48 hours, and the average contact time for batches 1112-D–1117-D was 3.48 hours. The difference in average contact time between the two batch sample sets was attributed to differences in the concentration of PVA in the initial solutions. Once analysis confirmed no detectable PVA remained in the solution, the batch was ready for micron filtration and ion exchange to remove both suspended and dissolved radioactive isotope contamination.

Step 5. Radioisotope Filtration Phase. Another important phase of the large-scale test was the study of this process's ability to remove radioactive contamination from the treated PVA waste stream. In this phase, the reacted waste stream containing radioactive contaminants was pumped from the solution reactor through a series of micron filters and ion exchange resin beds, then recycled back to the solution reactor. Between each step of this process, samples were collected to determine where and to what degree the radioactive isotopes had been removed. The results of analysis are tabulated in Table 4 (FIG. 10). The standard measurement units of radioactivity concentration are microcuries per cubic centimeter (µc/cc). Decontamination factor (Decon Factor) is a commonly used term that annotates filter media removal efficiency. It was determined by dividing inlet concentration by outlet concentration. For example, if inlet concentration was 100 µc/cc and outlet concentration was 10 µc/cc, then the Decon Factor would be 10. The alphanumeric symbols across the top of Table 4 (FIG. 10) are standard chemistry nomenclature for the various chemical isotopes present and of interest in this case. The number represents the atomic mass number for the element. The Decon Factor is equal to the Solution Tank Activity divided by the IX (ion exchange) Effluent Activity. The System Decon Factor is the equal to the Reaction tank Activity divided by the DC (decomposition) Effluent Activity. "LLD" represents an activity level below the lower limit of detection.

The far left hand column of Table 4 (FIG. 10) represents the batch numbers. Batches PV06D through PV09D were filtered and run through an ion exchange unit consisting of resin with a 2:1 cation to anion ratio. Batches PV13D through PV15DR were filtered and run through an ion exchange unit consisting of resin with a 2:1 anion to cation ratio. In the second column from the left, the headings of Decon Factor and System DF represent the total decontamination of each of the radioisotopes listed separately and collectively. The isotopes most prevalent in the batches analyzed were Cobalt 58 and Cobalt 60. These two isotopes were more efficiently removed in the filter and ion exchange resin where a 2:1 anion to cation ratio was used.

The monitoring of the solution conductivity and pH was found to be an indirect but excellent means to predict the efficiency of isotope depletion. The conductivity of the wastewater returning to the solution reactor gave an indication of the extent to which heavy metal isotopes were removed, and the return water pH gave an indication of resin bed life. When the conductivity and pH of the solution reactor and recycle water equalized, the reacted and primary treated water was ready for transfer to pH correction and secondary biological treatment to remove residual dissolved organics.

Step 6. pH Correction Phase. After completion of the radioisotope filtration phase, the reacted and primary treated wastewater was transferred from the solution reactor to the pH correction chamber. Here, a proportional automatic pH controller adjusts the pH of the incoming wastewater to fall within the limits of two predetermined set points. It was determined prior to startup of this study, that the end product of the photochemical oxidation-reduction of polyvinyl alcohol is acetic acid, and furthermore, that acetic acid is nonionic. The fact that acetic acid is nonionic allowed for the ion exchange and removal of radioactive isotopes in the filtration phase without loading the resin with dissolved organics. To correct pH, the controller injected sodium hydroxide into the solution containing acetate of the acetic acid. This resulted in the formation of a sodium acetate solution, which was then ready for introduction to secondary biological treatment.

Step 7. Biological Treatment Phase. Once neutralized, the solution still contained a significant organic load. The solution was metered through a series of aerobic fixed media bioreactor cells. Each cell consisted of a vertical tower with internal recirculation across fixed media colonized with microorganisms, which in turn biochemically degraded the residual sodium acetate dissolved in the solution. The feed rate of acetate solution to the bioreactor cells was based on the relationship of the following dynamics:

Concentration of sodium acetate in solution
Surface area of fixed media available for microbial colonization
Concentration of dissolved oxygen in solution
Concentration of macro-nutrients in solution
The detention time within the bio-cell reactors
Discharge limitations for total organic carbon concentration A removal rate of 80 to 90% of the total pounds of TOC would be considered normal for a system where the listed dynamics are monitored and balanced. If the influent TOC loading is too high or the effluent discharge limitation is exceptionally tight, the addition of enhanced biological treatment may be necessary. Fluidized bed bioreactor treatment utilizing pulverized activated carbon (PAC) is an enhanced biological treatment well suited to this application. A PAC chamber is one in which dried pulverized activated carbon is charged to an aeration chamber to form a fluidized bed bioreactor. The pulverized carbon becomes a suspended substrate for bacterial growth and attachment, thus removing the bacteria from the growth medium. Observation of a 25–30% mixed liquor suspended solids represents the optimum concentration to provide maximum surface area for bacterial growth. When used in combination with other forms of secondary treatment, such as, but not limited to, fixed media bioreactors, total combined TOC removal may improve to 95–99%.

Example 15

In a similar fashion to the experiments described in examples 1–6, nine identical test samples were prepared by introducing 100 grams of dry polyvinyl alcohol, 75 grams of 35% hydrogen peroxide, and 2000 mL of water into a solution reactor. The mixture was then heated to a temperature of approximately 101–102° C. for approximately 1 hour. After one hour of heating, the pH of all nine reacted aqueous solutions was determined to be within the range of 2.8 to 3.3. Likewise, the presence of polyvinyl alcohol was no longer detected in any of the reacted solutions. The results of this experiment can be found in Table 5 (FIG. 11).

While this invention has been described in connection with preferred embodiments, it is not intended to limit the scope of the invention to the particular form set forth, but on the contrary, it is intended to cover such alternatives, modifications, and equivalents as may be included within the spirit and scope of the invention as defined by the appended claims. For example, there are numerous variations and combinations of structural features, e.g., pumps, plumbing lines, plumbing connections, and value arrangements that can be made to establish the necessary connections between the essential components of the described system. Also, one skilled in the art will appreciate that in practicing the process of this invention, only reasonable experimentation will be required to optimize process conditions as a function of the polymer/degradation-enhancing reactant to be treated and the equipment selected or available to perform the invention.

What is claimed is:

1. A process for treating an aqueous environment containing polyvinyl alcohol and radioactive material, said process comprising the steps of:
   a) introducing a sufficient amount of at least one photochemically reactive oxidizing agent into the aqueous environment containing polyvinyl alcohol and radioactive material in order to oxidize at least a portion of the polyvinyl alcohol and provide at least one organic acid upon irradiation;
   b) irradiating the aqueous environment containing polyvinyl alcohol and radioactive material with electromagnetic radiation for sufficient time to accelerate the oxidation of the polyvinyl alcohol;
   c) measuring the pH of the aqueous environment before and after irradiation to determine the degree of oxidation of the polyvinyl alcohol; and
   further comprising one or more steps of:
   filtering at least a portion of non-solubilizing material from the aqueous environment;
   heating the aqueous environment for a sufficient amount of time to form at least one organic acid;
   filtering at least a portion of radioactive material from the aqueous environment; and
   neutralizing the pH of the aqueous environment.

2. The process of claim 1, wherein substantial completion of the oxidation of the polyvinyl alcohol is indicated by a drop in pH of the aqueous environment of about 3.0 pH units in about 3.5 pH units.

3. The process of claim 1, wherein substantial completion of the oxidation of the polyvinyl alcohol is indicated by a drop in pH of the aqueous environment of about 2.0 pH units to about 6.0 pH units.

4. The process of claim 1, wherein the at least one oxidizing agent comprises hydrogen peroxide.

5. The process of claim 1, further comprising:
   separating at least a portion of the radioactive material from the aqueous environment.

6. A process for treating a material comprising at least one polymer, said process comprising the steps:
   introducing at least one oxidizing agent into an aqueous environment containing (i) the at least one polymer and (ii) radioactive material, wherein said at least one polymer is a polymer capable of being reacted, degraded or broken down into at least one degradation product;
   irradiating the aqueous environment for a period of time sufficient to react, degrade or break dawn at least a portion of the at least one polymer to produce at least one degradation product; and
   further comprising one or more steps of:
   filtering at least a portion of non-solubilizing material from the aqueous environment;
   heating the aqueous environment for a sufficient amount of time to form at least one organic acid;
   filtering at Icast a portion of radioactive material from the aqueous environment; and
   neutralizing the pH of the aqueous environment.

7. The process of claim 6, further comprising heating the aqueous environment to a reaction temperature ranging from about 180° F. to about 250° F.

8. The process of claim 6, wherein the at least one oxidizing agent comprises hydrogen peroxide.

9. The process of claim 8, wherein a ratio of milliliters of hydrogen peroxide to grams of the at least one polymer is at least about 0.5.

10. The process of claim 6, further comprising a filtration step wherein at least a portion of the radioactive material is filtered from the aqueous environment.

11. The process of claim 6, wherein the at least one polymer comes from one or more articles manufactured from fibers, non-woven fabrics, woven fabrics, knitted fabrics, plastics, films, resins, molded articles, or a combination thereof.

12. The process of claim 11, wherein the one or more articles comprise a garment, protective clothing, apparel, a linen, a drape, a towel, a composite fabric, a film, a composite film, a laminate fabric, a laminated film, a sponge, a web, a plastic bag, a gauze, a pad, a wipe, a boom, a pillow, a filament, powder, granules, a bandage, or a combination thereof.

13. The process of claim 6, wherein the at least one oxidizing agent comprises $H_2O_2$, $Fe^{+3}$, $Cu^{+2}$, $Ag^+$, $O_2$, $Cl_2$, $ClO^-$, $HNO_3$, $KMnO_4$, $K_2CrO_4$, $K_2Cr_2O_7$, $Ce(SO_4)_2$, $K_2S_2O_8$, $KIO_3$, ozone, or a combination thereof.

14. The process of claim 6, wherein the at least one oxidizing agent comprises ozone.

15. The process of claim 6, wherein the aqueous environment is heated in a pressurized system to a reaction temperature ranging from about 212° F. to about 250° F.

16. The process of claim 6, wherein the at least one polymer comprises polyvinyl alcohol.

17. A process for treating an aqueous solution containing (i) polyvinyl alcohol and (ii) radioactive material, said process comprising:
   introducing at least one oxidizing agent into the aqueous solution; and
   irradiating the aqueous solution for a period of time sufficient to react degrade or break down at least a portion of the polyvinyl alcohol to produce at least one degradation product;
   wherein the aqueous solution is heated in a pressurized system to a reaction temperature ranging from about 212° F. to about 250° F.

18. The process of claim 17, further comprising:
   separating at least a portion of the radioactive material from the aqueous environment.

19. The process of claim 17, wherein the polyvinyl alcohol comes from one or more articles manufactured from fibers, non-woven fabrics, woven fabrics, knitted fabrics, plastics, films, resins, molded articles, or a combination thereof.

20. The process of claim 17, wherein the at least one oxidizing agent comprises ozone.

21. The process of claim 17, wherein the at least one oxidizing agent comprises hydrogen peroxide.

* * * * *